(12) United States Patent
Hashimoto et al.

(10) Patent No.: US 12,134,378 B2
(45) Date of Patent: Nov. 5, 2024

(54) VEHICLE COLLISION AVOIDANCE ASSISTANCE DEVICE

(71) Applicant: TOYOTA JIDOSHA KABUSHIKI KAISHA, Toyota (JP)

(72) Inventors: Sho Hashimoto, Shizuoka (JP); Yumi Shimanaka, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 316 days.

(21) Appl. No.: 17/657,384

(22) Filed: Mar. 31, 2022

(65) Prior Publication Data

US 2022/0314972 A1 Oct. 6, 2022

(30) Foreign Application Priority Data

Apr. 5, 2021 (JP) .................................. 2021-064011

(51) Int. Cl.
*B60W 30/09* (2012.01)
*B60W 30/095* (2012.01)
*B60W 50/00* (2006.01)

(52) U.S. Cl.
CPC .......... *B60W 30/09* (2013.01); *B60W 30/095* (2013.01); *B60W 30/0953* (2013.01); *B60W 30/0956* (2013.01); *B60W 50/0097* (2013.01); *B60W 2510/182* (2013.01); *B60W 2520/10* (2013.01); *B60W 2530/10* (2013.01);
(Continued)

(58) Field of Classification Search
CPC ............... B60W 30/09; B60W 30/095; B60W 30/0953; B60W 30/0956; B60W 50/0097; B60W 2510/182; B60W 2520/10; B60W 2530/10; B60W 2540/049; B60W 2540/12; B60W 2552/15; B60W 2552/40;
(Continued)

(56) References Cited

U.S. PATENT DOCUMENTS 9,701,307 B1 * 7/2017 Newman ............... B60W 30/09
11,299,145 B2 * 4/2022 Kim ....................... G05D 1/0223
(Continued)

FOREIGN PATENT DOCUMENTS

EP       3135550 A1    3/2017
JP    H05270369 A    10/1993
(Continued)

*Primary Examiner* — Dale W Hilgendorf
(74) *Attorney, Agent, or Firm* — SoraIP, Inc.

(57) ABSTRACT

A vehicle collision avoidance assistance device is configured to perform forced braking or forced steering when a driver's vehicle has a possibility of colliding with an object ahead of the driver's vehicle, acquire at least one of information related to a condition of the driver's vehicle and information related to a situation around the driver's vehicle, determine, based on the acquired information, whether a request condition for requesting execution of the forced steering is satisfied and whether a forbiddance condition for forbidding the execution of the forced steering is satisfied, perform the forced braking when the request condition is not satisfied regardless of whether the forbiddance condition is satisfied, perform the forced steering when the forbiddance condition is not satisfied and the request condition is satisfied, and perform the forced braking when the forbiddance condition is satisfied though the request condition is satisfied.

8 Claims, 15 Drawing Sheets

(52) U.S. Cl.
CPC ... *B60W 2540/049* (2020.02); *B60W 2540/12* (2013.01); *B60W 2552/15* (2020.02); *B60W 2552/40* (2020.02); *B60W 2554/4041* (2020.02); *B60W 2710/18* (2013.01); *B60W 2710/20* (2013.01)

(58) Field of Classification Search
CPC ..... B60W 2554/4041; B60W 2710/18; B60W 2710/20
See application file for complete search history.

(56) References Cited

U.S. PATENT DOCUMENTS

| | | | | |
|---|---|---|---|---|
| 11,794,729 | B2* | 10/2023 | Javaid | B60W 30/09 |
| 2015/0232090 | A1* | 8/2015 | Jeon | B60W 30/095 701/1 |
| 2015/0353133 | A1* | 12/2015 | Mukai | B62D 15/0265 701/41 |
| 2017/0057498 | A1* | 3/2017 | Katoh | B60W 30/0956 |
| 2017/0072950 | A1* | 3/2017 | Sim | B60W 10/184 |
| 2018/0056996 | A1* | 3/2018 | Lee | B60W 30/09 |
| 2019/0143966 | A1 | 5/2019 | Mukai et al. | |
| 2019/0270448 | A1 | 9/2019 | Takasao | |
| 2019/0291728 | A1* | 9/2019 | Shalev-Shwartz | B60W 60/00274 |
| 2020/0269857 | A1* | 8/2020 | Tsuji | B60W 30/182 |
| 2021/0107513 | A1* | 4/2021 | Goto | B60W 30/09 |
| 2022/0144257 | A1* | 5/2022 | Maeda | B60W 30/095 |
| 2022/0258730 | A1* | 8/2022 | Morotomi | B60W 30/0956 |
| 2023/0322208 | A1* | 10/2023 | Rojas | B60W 10/20 701/41 |

FOREIGN PATENT DOCUMENTS

| | | |
|---|---|---|
| JP | 2015-232825 A | 12/2015 |
| JP | 2016117319 A | 6/2016 |
| JP | 2017043262 A | 3/2017 |
| JP | 2017-191383 A | 10/2017 |
| JP | 2019-151185 A | 9/2019 |
| KR | 10-1999-0002230 A | 1/1999 |
| KR | 10-2014-0076743 A | 6/2014 |
| KR | 10-2017-0031913 A | 3/2017 |

* cited by examiner

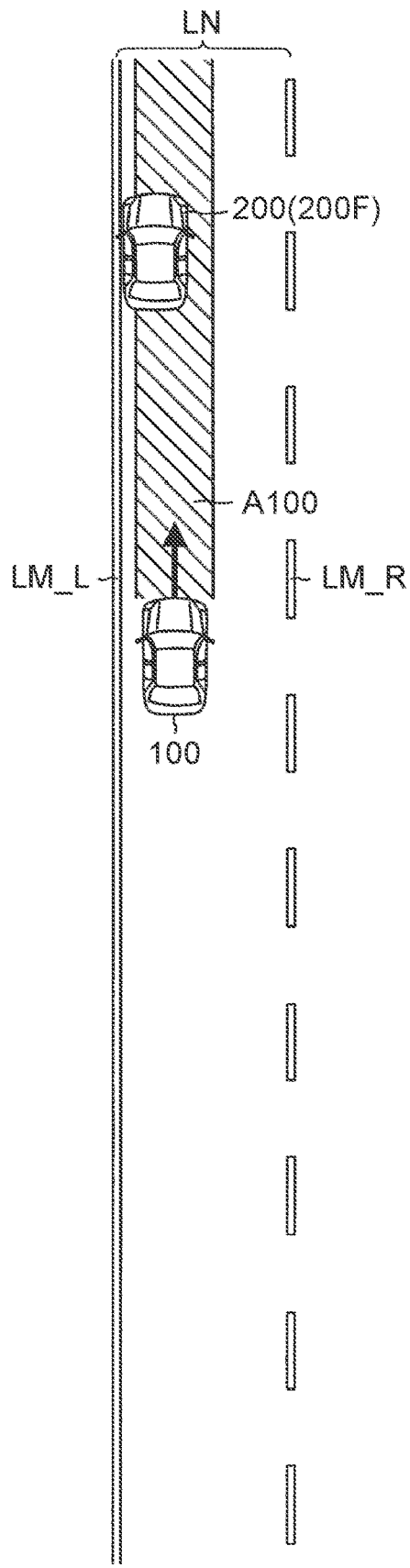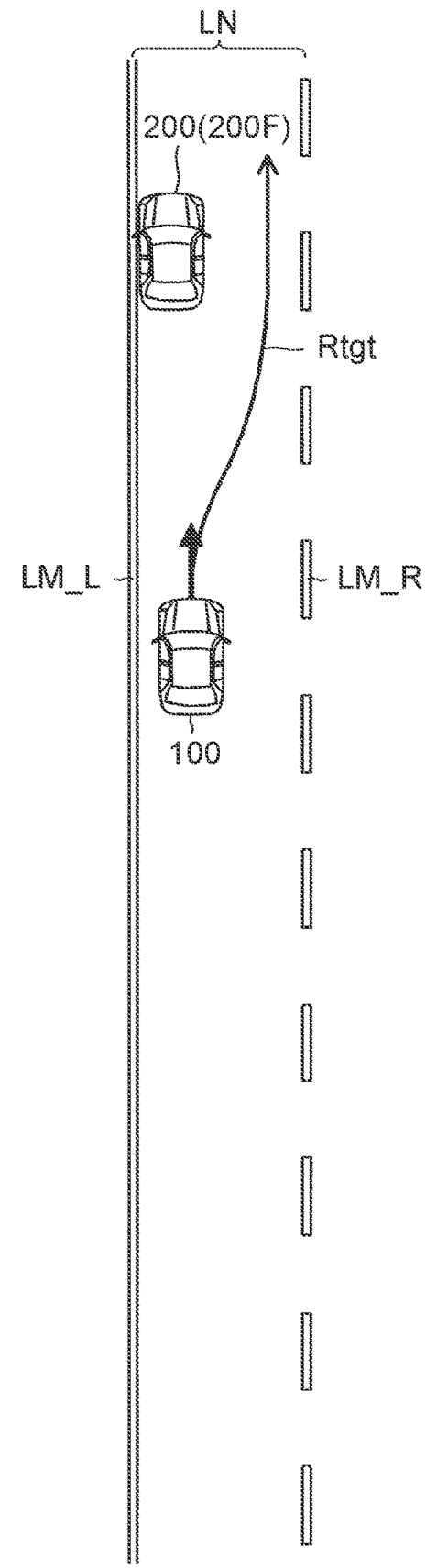

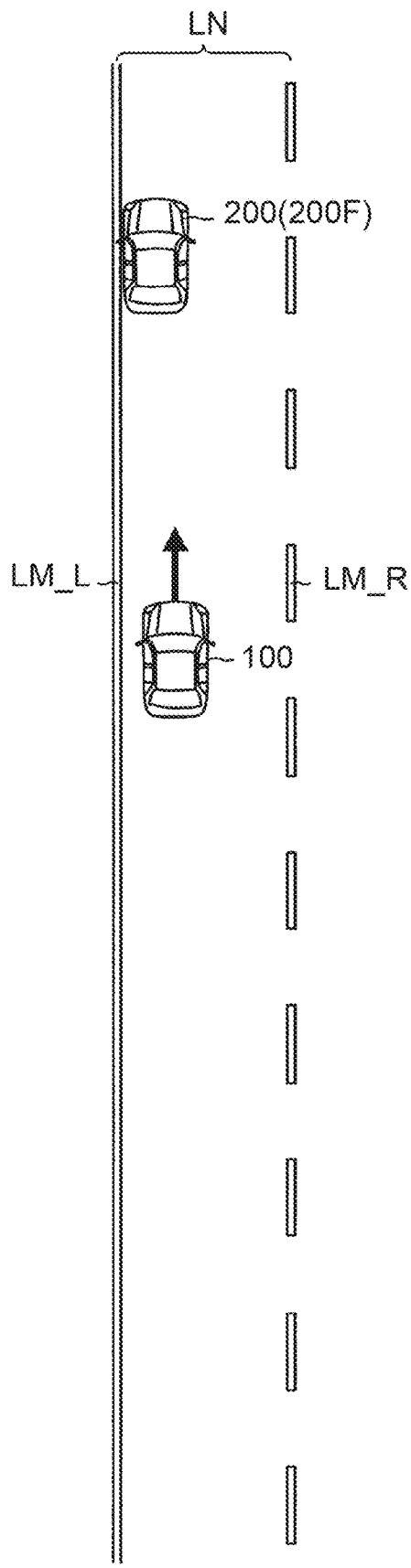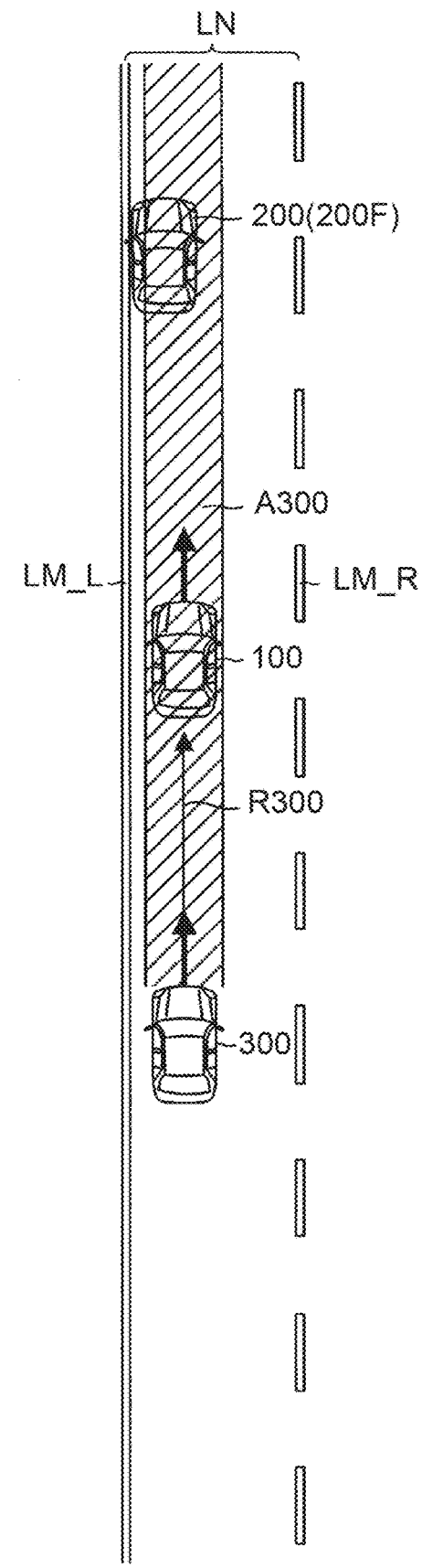

VEHICLE COLLISION AVOIDANCE ASSISTANCE DEVICE

CROSS-REFERENCE TO RELATED APPLICATION

This application claims priority to Japanese Patent Application No. 2021-064011 filed on Apr. 5, 2021, incorporated herein by reference in its entirety.

BACKGROUND

1. Technical Field

The present disclosure relates to a vehicle collision avoidance assistance device.

2. Description of Related Art

There is known a vehicle collision avoidance assistance device configured to perform collision avoidance braking and collision avoidance steering to avoid a collision between a driver's vehicle and an object ahead of the driver's vehicle. The collision avoidance braking is a collision avoidance process for avoiding a collision between the driver's vehicle and an object by forcibly applying a braking force to the driver's vehicle even if the driver of the driver's vehicle does not operate a brake pedal. The collision avoidance steering is a collision avoidance process for avoiding a collision between the driver's vehicle and an object by forcibly steering the driver's vehicle even if a steering wheel is not operated in the driver's vehicle.

As such a vehicle collision avoidance assistance device, there is known a vehicle collision avoidance assistance device configured to start collision avoidance braking when determination is made that the driver's vehicle may collide with an object ahead of the driver's vehicle, and start collision avoidance steering when determination is made that the collision between the driver's vehicle and the object ahead of the driver's vehicle is still unavoidable (see, for example, Japanese Unexamined Patent Application Publication No. 2017-43262 (JP 2017-43262 A)).

SUMMARY

The vehicle collision avoidance assistance device described above starts the collision avoidance braking instead of the collision avoidance steering when determination is made that the driver's vehicle may collide with an object ahead of the driver's vehicle regardless of a situation around the driver's vehicle. Depending on the situation around the driver's vehicle, however, the collision between the driver's vehicle and the object may be avoided more appropriately by starting the collision avoidance steering instead of the collision avoidance braking.

The present disclosure provides a vehicle collision avoidance assistance device capable of performing an appropriate collision avoidance process depending on a situation around a driver's vehicle.

A first aspect of the present disclosure relates to a vehicle collision avoidance assistance device including a processor. The processor is configured to perform forced braking or forced steering when a driver's vehicle has a possibility of colliding with an object ahead of the driver's vehicle. The forced braking is braking for avoiding a collision between the driver's vehicle and the object by applying a braking force to the driver's vehicle to stop the driver's vehicle before the driver's vehicle collides with the object. The forced steering is steering for avoiding the collision between the driver's vehicle and the object by steering the driver's vehicle to pass by a side of the object. The processor is configured to acquire at least one of information related to a condition of the driver's vehicle and information related to a situation around the driver's vehicle, and determine, based on the acquired information, whether a request condition for requesting execution of the forced steering is satisfied and whether a forbiddance condition for forbidding the execution of the forced steering is satisfied. The processor is configured to perform, when the request condition is not satisfied, the forced braking regardless of whether the forbiddance condition is satisfied, perform the forced steering when the forbiddance condition is not satisfied and the request condition is satisfied, and perform, when the forbiddance condition is satisfied, the forced braking though the request condition is satisfied.

According to the first aspect, determination is made as to whether the request condition is satisfied and whether the forbiddance condition is satisfied in consideration of the condition of the driver's vehicle or the situation around the driver's vehicle. When the request condition is not satisfied, the forced braking is performed regardless of whether the forbiddance condition is satisfied. When the forbiddance condition is not satisfied and the request condition is satisfied, the forced steering is performed. When the forbiddance condition is satisfied, the forced braking is performed though the request condition is satisfied. Therefore, in a scene in which the execution of the forced steering is preferable such that the request condition is satisfied, the forced steering is performed except for a situation in which non-execution of the forced steering is preferable such that the forbiddance condition is satisfied. Thus, an appropriate collision avoidance process can be performed depending on the situation around the driver's vehicle.

In the first aspect, the processor may be configured to acquire a deterioration status of a braking device configured to apply the braking force to the driver's vehicle as the information related to the condition of the driver's vehicle, determine that the request condition is satisfied when the processor determines that the braking device deteriorates based on the deterioration status of the braking device, and determine that the request condition is not satisfied when the processor determines that the braking device does not deteriorate based on the deterioration status of the braking device.

The deterioration status of the braking device is an effective index for determining whether the execution of the forced steering instead of the forced braking is preferable. According to the configuration described above, the processor determines whether the request condition is satisfied in consideration of the deterioration status of the braking device. Thus, a more appropriate collision avoidance process can be performed depending on the situation around the driver's vehicle.

In the first aspect, the processor may be configured to acquire a deterioration status of a brake pad of a braking device configured to apply the braking force to the driver's vehicle as the information related to the condition of the driver's vehicle, determine that the request condition is satisfied when the processor determines that the brake pad deteriorates based on the deterioration status of the brake pad, and determine that the request condition is not satisfied when the processor determines that the brake pad does not deteriorate based on the deterioration status of the brake pad.

The deterioration status of the brake pad is an effective index for determining whether the execution of the forced steering instead of the forced braking is preferable. According to the configuration described above, the processor determines whether the request condition is satisfied in consideration of the deterioration status of the brake pad. Thus, a more appropriate collision avoidance process can be performed depending on the situation around the driver's vehicle.

In the first aspect, the processor may be configured to acquire a deterioration status of brake oil for operating a braking device configured to apply the braking force to the driver's vehicle as the information related to the condition of the driver's vehicle, determine that the request condition is satisfied when the processor determines that the brake oil deteriorates based on the deterioration status of the brake oil, and determine that the request condition is not satisfied when the processor determines that the brake oil does not deteriorate based on the deterioration status of the brake oil.

The deterioration status of the brake oil is an effective index for determining whether the execution of the forced steering instead of the forced braking is preferable. According to the configuration described above, the processor determines whether the request condition is satisfied in consideration of the deterioration status of the brake oil. Thus, a more appropriate collision avoidance process can be performed depending on the situation around the driver's vehicle.

In the first aspect, the processor may be configured to control an operation of a braking device configured to apply the braking force to the driver's vehicle such that the braking device to applies a braking force to the driver's vehicle based on an operation amount of a brake pedal of the driver's vehicle, acquire a deceleration of the driver's vehicle as the information related to the condition of the driver's vehicle when the brake pedal is operated by a driver of the driver's vehicle, determine that the request condition is satisfied when the deceleration is equal to or lower than a reference deceleration set based on the operation amount of the brake pedal operated by the driver, and determine that the request condition is not satisfied when the deceleration is higher than the reference deceleration.

The relationship between the operation amount of the brake pedal operated by the driver and the deceleration of the driver's vehicle at that time is an effective index for determining whether the execution of the forced steering instead of the forced braking is preferable. According to the configuration described above, the processor determines whether the request condition is satisfied in consideration of the relationship between the operation amount of the brake pedal operated by the driver and the deceleration of the driver's vehicle at that time. Thus, a more appropriate collision avoidance process can be performed depending on the situation around the driver's vehicle.

In the first aspect, the processor may be configured to acquire a vehicle speed of the driver's vehicle and a gradient of a road surface where the driver's vehicle is traveling. The processor may be configured not to acquire the deceleration of the driver's vehicle when the vehicle speed is lower than a reference vehicle speed or the gradient is larger than a reference gradient.

When the vehicle speed of the driver's vehicle is low or the gradient of the road surface where the driver's vehicle is traveling is large, there is a possibility that the deceleration of the driver's vehicle cannot be acquired accurately. According to the configuration described above, the deceleration of the driver's vehicle is not acquired when the vehicle speed of the driver's vehicle is lower than the reference vehicle speed or the gradient of the road surface where the driver's vehicle is traveling is larger than the reference gradient. Therefore, it is possible to acquire only an accurate deceleration of the driver's vehicle.

In the first aspect, the processor may be configured to acquire a weight of the driver's vehicle as the information related to the condition of the driver's vehicle, determine that the request condition is satisfied when the processor determines that the weight is equal to or larger than a predetermined weight, and determine that the request condition is not satisfied when the processor determines that the weight is smaller than the predetermined weight.

Since the weight of the driver's vehicle affects the deceleration of the driver's vehicle when the driver's vehicle is braked, the weight of the driver's vehicle is an effective index for determining whether the execution of the forced steering instead of the forced braking is preferable. According to the configuration described above, determination is made as to whether the request condition is satisfied in consideration of the weight of the driver's vehicle. Thus, a more appropriate collision avoidance process can be performed depending on the situation around the driver's vehicle.

In the first aspect, the processor may be configured to acquire the number of occupants of the driver's vehicle as the information related to the condition of the driver's vehicle, determine that the request condition is satisfied when the number of occupants is equal to or larger than a predetermined number, and determine that the request condition is not satisfied when the number of occupants is smaller than the predetermined number.

Since the weight of the driver's vehicle affects the deceleration of the driver's vehicle when the driver's vehicle is braked as described above, the weight of the driver's vehicle is an effective index for determining whether the execution of the forced steering instead of the forced braking is preferable. The weight of the driver's vehicle changes depending on the number of occupants of the driver's vehicle. According to the configuration described above, determination is made as to whether the request condition is satisfied in consideration of the number of occupants of the driver's vehicle. Thus, a more appropriate collision avoidance process can be performed depending on the situation around the driver's vehicle.

In the first aspect, the processor may be configured to acquire a pressure in a master cylinder of a braking device as the information related to the condition of the driver's vehicle. The braking device may be configured to apply the braking force to the driver's vehicle. The processor may be configured to determine that the request condition is satisfied when the pressure in the master cylinder is equal to or lower than a predetermined pressure, and determine that the request condition is not satisfied when the pressure in the master cylinder is higher than the predetermined pressure.

The pressure in the master cylinder is an effective index for determining whether the execution of the forced steering instead of the forced braking is preferable. According to the configuration described above, determination is made as to whether the request condition is satisfied in consideration of the pressure in the master cylinder. Thus, a more appropriate collision avoidance process can be performed depending on the situation around the driver's vehicle.

In the first aspect, the processor may be configured to determine whether a succeeding moving object moving behind the driver's vehicle in the same direction as a traveling direction of the driver's vehicle has a collision possibility of colliding with the driver's vehicle under an assumption that the forced braking is performed, acquire, as the information related to the situation around the driver's vehicle, a result of determination as to whether the succeeding moving object has the collision possibility, determine that the request condition is satisfied when the processor determines that the succeeding moving object has the possibility of colliding with the driver's vehicle, and determine that the request condition is not satisfied when the processor determines that the succeeding moving object does not have the possibility of colliding with the driver's vehicle.

Whether the succeeding moving object collides with the driver's vehicle when the forced braking is performed is an effective index for determining whether the execution of the forced steering instead of the forced braking is preferable. According to the configuration described above, determination is made as to whether the request condition is satisfied in consideration of whether the succeeding moving object collides with the driver's vehicle when the forced braking is performed. Thus, a more appropriate collision avoidance process can be performed depending on the situation around the driver's vehicle.

In the first aspect, the processor may be configured to acquire a position of the succeeding moving object, determine that the succeeding moving object has the collision possibility when the processor determines that the succeeding moving object is present within a range of a predetermined distance from the driver's vehicle based on the position of the succeeding moving object, and determine that the succeeding moving object does not have the collision possibility when the processor determines that the succeeding moving object is not present within the range of the predetermined distance from the driver's vehicle based on the position of the succeeding moving object.

The position of the succeeding moving object is an effective index for accurately determining whether the succeeding moving object collides with the driver's vehicle when the forced braking is performed. According to the configuration described above, determination is made by using the position of the succeeding moving object as to whether the succeeding moving object collides with the driver's vehicle when the forced braking is performed. Thus, a more appropriate collision avoidance process can be performed depending on the situation around the driver's vehicle.

In the first aspect, the processor may be configured to acquire a predicted traveling area of the driver's vehicle, acquire a position of the succeeding moving object and a predicted moving area of the succeeding moving object, determine that the succeeding moving object has the collision possibility when the processor determines that the predicted moving area and the predicted traveling area overlap each other and the succeeding moving object is present within a range of a predetermined distance from the driver's vehicle based on the position of the succeeding moving object, determine that the succeeding moving object does not have the collision possibility when the processor determines that the predicted moving area and the predicted traveling area overlap each other and the succeeding moving object is not present within the range of the predetermined distance from the driver's vehicle based on the position of the succeeding moving object, and determine that the succeeding moving object does not have the collision possibility regardless of whether the succeeding moving object is present within the range of the predetermined distance from the driver's vehicle when the processor determines that the predicted moving area and the predicted traveling area do not overlap each other.

Not only the position of the succeeding moving object but also the information on whether the predicted moving area and the predicted traveling area overlap each other is an effective index for accurately determining whether the succeeding moving object collides with the driver's vehicle when the forced braking is performed. According to the configuration described above, by using not only the position of the succeeding moving object but also the information on whether the predicted moving area and the predicted traveling area overlap each other, the processor determines whether the succeeding moving object collides with the driver's vehicle when the forced braking is performed. Thus, a more appropriate collision avoidance process can be performed depending on the situation around the driver's vehicle.

In the first aspect, the processor may be configured to acquire a gradient of a road surface where the driver's vehicle is traveling as the information related to the situation around the driver's vehicle, determine that the request condition is satisfied when the gradient is smaller than zero and an absolute value of the gradient is equal to or larger than a first gradient, and determine that the request condition is not satisfied when the gradient is equal to or larger than zero, or when the absolute value of the gradient is smaller than the first gradient and the gradient is smaller than zero.

The gradient of the road surface where the driver's vehicle is traveling is an effective index for determining whether the execution of the forced steering instead of the forced braking is preferable. According to the configuration described above, the processor determines whether the request condition is satisfied in consideration of the gradient of the road surface where the driver's vehicle is traveling. Thus, a more appropriate collision avoidance process can be performed depending on the situation around the driver's vehicle.

In the first aspect, the processor may be configured to acquire a gradient of a road surface where the driver's vehicle is traveling and a friction coefficient of the road surface as the information related to the situation around the driver's vehicle, and determine that the request condition is satisfied when the friction coefficient is equal to or smaller than a predetermined friction coefficient, the gradient is smaller than zero, and an absolute value of the gradient is equal to or larger than a first gradient. The processor may be configured to determine that the request condition is not satisfied when the friction coefficient is equal to or smaller than the predetermined friction coefficient and the gradient is equal to or larger than zero, or when the absolute value of the gradient is smaller than the first gradient and the gradient is smaller than zero. The processor may be configured to determine that the request condition is satisfied when the friction coefficient is larger than the predetermined friction coefficient, the gradient is smaller than zero, the absolute value of the gradient is equal to or larger than the first gradient, and the absolute value of the gradient is equal to or smaller than a second gradient that is larger than the first gradient. The processor may be configured to determine that the request condition is not satisfied when the friction coefficient is larger than the predetermined friction coefficient and the gradient is equal to or larger than zero, or when the gradient is smaller than zero and the absolute value of the gradient is smaller than the first gradient or larger than the second gradient.

The friction coefficient of the road surface where the driver's vehicle is traveling is an effective index for determining whether non-execution of the forced steering is preferable. According to the configuration described above, the processor determines whether the request condition is satisfied in consideration of the gradient and the friction coefficient of the road surface where the driver's vehicle is traveling. Thus, a more appropriate collision avoidance process can be performed depending on the situation around the driver's vehicle.

The processor may be configured to acquire a cant of a road surface where the driver's vehicle is traveling as the information related to the situation around the driver's vehicle, determine that the forbiddance condition is satisfied when the cant is equal to or larger than a predetermined cant, and determine that the forbiddance condition is not satisfied when the cant is smaller than the predetermined cant.

The cant of the road surface where the driver's vehicle is traveling is an effective index for determining whether non-execution of the forced steering is preferable. According to the configuration described above, the processor determines whether the forbiddance condition is satisfied in consideration of the cant of the road surface where the driver's vehicle is traveling. Thus, a more appropriate collision avoidance process can be performed depending on the situation around the driver's vehicle.

The processor may be configured to acquire, as the information related to the condition of the driver's vehicle, information on whether vehicle stability control for adjusting a driving force or a braking force applied to the driver's vehicle is performed to stabilize traveling behavior of the driver's vehicle, determine that the forbiddance condition is satisfied when the vehicle stability control is performed, and determine that the forbiddance condition is not satisfied when the vehicle stability control is not performed.

Whether the vehicle stability control is performed is an effective index for determining whether non-execution of the forced steering is preferable. According to the configuration described above, the processor determines whether the forbiddance condition is satisfied in consideration of whether the vehicle stability control is performed. Thus, a more appropriate collision avoidance process can be performed depending on the situation around the driver's vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6A is a diagram illustrating a scene in which the driver's vehicle approaches the object (vehicle) present in the predicted traveling area of the driver's vehicle;

FIG. 6B is a diagram illustrating a target avoidance path in forced steering;

FIG. 7A is a diagram illustrating a scene in which an object such as a vehicle is not present behind the driver's vehicle;

FIG. 7B is a diagram illustrating a scene in which an object (vehicle) is present behind the driver's vehicle;

DETAILED DESCRIPTION OF EMBODIMENTS

Figure 1:
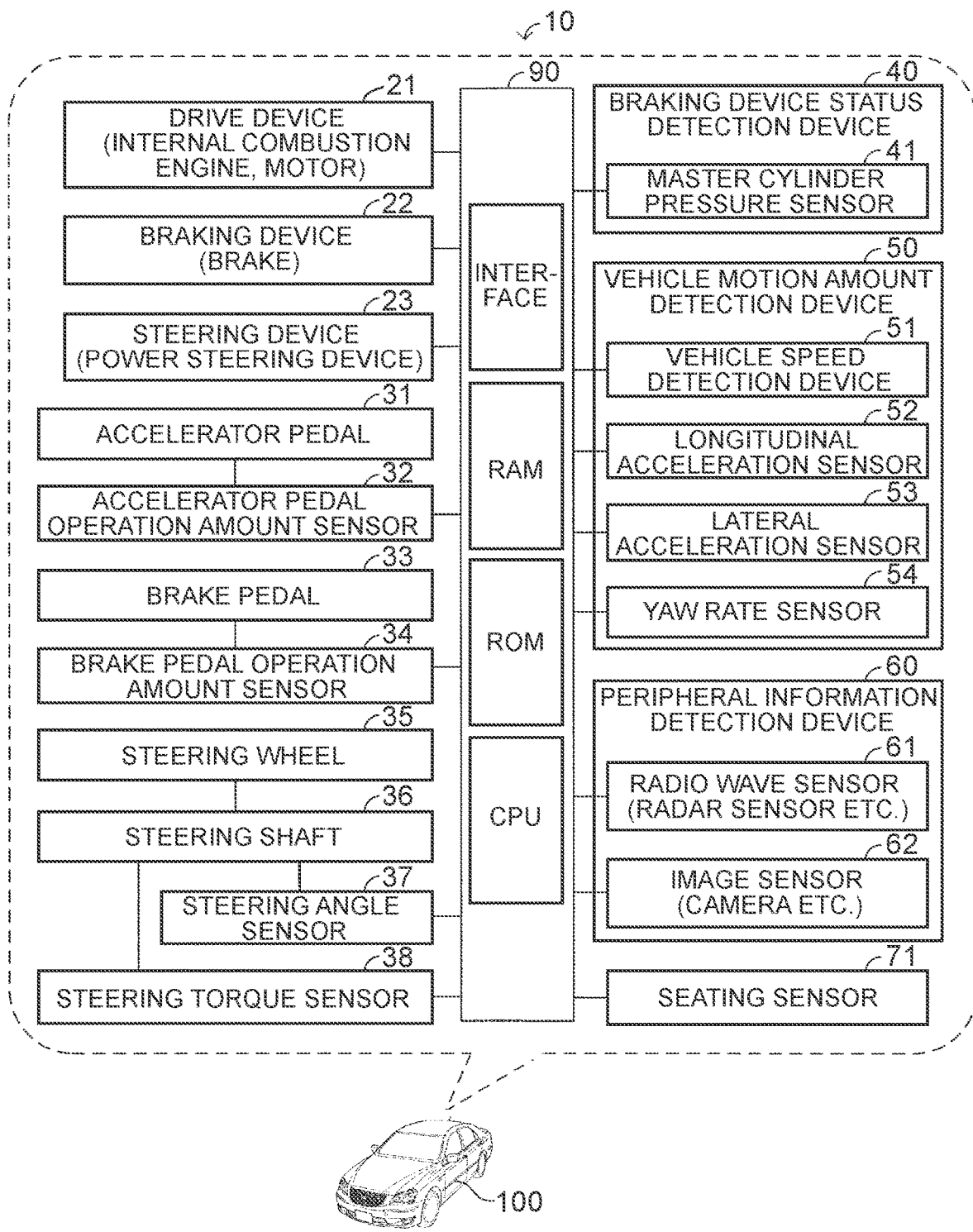
FIG. 1 is a diagram illustrating a vehicle collision avoidance assistance device according to an embodiment of the present disclosure and a vehicle (driver's vehicle) including the vehicle collision avoidance assistance device.

A vehicle collision avoidance assistance device according to an embodiment of the present disclosure will be described below with reference to the drawings. As illustrated in FIG. 1, a vehicle collision avoidance assistance device 10 according to the embodiment of the present disclosure is mounted on a driver's vehicle 100.

ECU

The vehicle collision avoidance assistance device 10 includes an ECU 90. The term "ECU" is an abbreviation of "electronic control unit". The ECU 90 includes a microcomputer as a main component. The microcomputer includes a central processing unit (CPU), a read only memory (ROM), a random access memory (RAM), a non-volatile memory, and an interface. The CPU executes instructions, programs, or routines stored in the ROM to implement various functions.

Drive Device and Other Devices

The driver's vehicle 100 includes a drive device 21, a braking device 22, and a steering device 23.

Drive Device

The drive device 21 outputs a drive torque TQ_D (driving force) to be applied to the driver's vehicle 100 to cause the driver's vehicle 100 to travel, and is typified by an internal combustion engine or a motor. The drive device 21 is electrically connected to the ECU 90. The ECU 90 can control the drive torque TQ_D to be output from the drive device 21 by controlling an operation of the drive device 21.

Braking Device

The braking device 22 outputs a braking torque TQ_B (braking force) to be applied to the driver's vehicle 100 to brake the driver's vehicle 100, and is typified by a brake. The braking device 22 is electrically connected to the ECU 90. The ECU 90 can control the braking torque TQ_B to be output from the braking device 22 by controlling an operation of the braking device 22.

Steering Device

The steering device 23 outputs a steering torque TQs (steering force) to be applied to the driver's vehicle 100 to steer the driver's vehicle 100, and is typified by a power steering device. The steering device 23 is electrically connected to the ECU 90. The ECU 90 can control the steering torque TQs to be output from the steering device 23 by controlling an operation of the steering device 23.

Sensors and Other Devices

The driver's vehicle 100 further includes an accelerator pedal 31, an accelerator pedal operation amount sensor 32, a brake pedal 33, a brake pedal operation amount sensor 34, a steering wheel 35, a steering shaft 36, a steering angle sensor 37, a steering torque sensor 38, a braking device status detection device 40, a vehicle motion amount detection device 50, a peripheral information detection device 60, and a seating sensor 71.

Accelerator Pedal Operation Amount Sensor

The accelerator pedal operation amount sensor 32 detects an operation amount of the accelerator pedal 31. The accelerator pedal operation amount sensor 32 is electrically connected to the ECU 90. The accelerator pedal operation amount sensor 32 transmits information on the detected operation amount of the accelerator pedal 31 to the ECU 90. The ECU 90 acquires the operation amount of the accelerator pedal 31 as an accelerator pedal operation amount AP based on the information.

The ECU 90 acquires a requested drive torque TQ_D_req (requested driving force) by calculation based on the accelerator pedal operation amount AP and a vehicle speed V100 of the driver's vehicle 100. The requested drive torque TQ_D_req is a drive torque TQ_D to be output from the drive device 21 by request. The ECU 90 controls the operation of the drive device 21 to output the requested drive torque TQ_D_req.

Brake Pedal Operation Amount Sensor

The brake pedal operation amount sensor 34 detects an operation amount of the brake pedal 33. The brake pedal operation amount sensor 34 is electrically connected to the ECU 90. The brake pedal operation amount sensor 34 transmits information on the detected operation amount of the brake pedal 33 to the ECU 90. The ECU 90 acquires the operation amount of the brake pedal 33 as a brake pedal operation amount BP based on the information.

The ECU 90 acquires a requested braking torque TQ_B_req (requested braking force) by calculation based on the brake pedal operation amount BP. The requested braking torque TQ_B_req is a braking torque TQ_B to be output from the braking device 22 by request. The ECU 90 controls the operation of the braking device 22 to output the requested braking torque TQ_B_req.

Steering Angle Sensor

The steering angle sensor 37 detects a rotation angle of the steering shaft 36 with respect to a neutral position. The steering angle sensor 37 is electrically connected to the ECU 90. The steering angle sensor 37 transmits information on the detected rotation angle of the steering shaft 36 to the ECU 90. The ECU 90 acquires the rotation angle of the steering shaft 36 as a steering angle $\theta$ steer based on the information.

Steering Torque Sensor

The steering torque sensor 38 detects a torque input to the steering shaft 36 by the driver via the steering wheel 35. The steering torque sensor 38 is electrically connected to the ECU 90. The steering torque sensor 38 transmits information on the detected torque to the ECU 90. The ECU 90 acquires the torque input to the steering shaft 36 by the driver via the steering wheel 35 (driver input torque TQs_driver) based on the information.

Braking Device Status Detection Device

The braking device status detection device 40 detects a status of the braking device 22, and includes a master cylinder pressure sensor 41 in this example.

Master Cylinder Pressure Sensor

The master cylinder pressure sensor 41 detects a pressure in a master cylinder of the braking device 22. The master cylinder pressure sensor 41 is electrically connected to the ECU 90. The master cylinder pressure sensor 41 transmits information on the detected pressure in the master cylinder to the ECU 90. The ECU 90 acquires the pressure in the master cylinder (master cylinder pressure Pm) based on the information.

Vehicle Motion Amount Detection Device

The vehicle motion amount detection device 50 detects a motion amount of the driver's vehicle 100, and includes a vehicle speed detection device 51, a longitudinal acceleration sensor 52, a lateral acceleration sensor 53, and a yaw rate sensor 54 in this example.

Vehicle Speed Detection Device

The vehicle speed detection device 51 detects a vehicle speed of the driver's vehicle 100, and is typified by a wheel speed sensor. The vehicle speed detection device 51 is electrically connected to the ECU 90. The vehicle speed detection device 51 transmits information on the detected vehicle speed of the driver's vehicle 100 to the ECU 90. The ECU 90 acquires the vehicle speed V100 of the driver's vehicle 100 based on the information.

The ECU 90 acquires a requested steering torque TQs_req by calculation based on the acquired steering angle $\theta$ steer, the acquired driver input torque TQs_driver, and the acquired vehicle speed V100. The requested steering torque TQs_req is a steering torque TQs to be output from the steering device 23 by request. The ECU 90 controls the operation of the steering device 23 to output the requested steering torque TQs_req from the steering device 23. When performing forced steering described later, the ECU 90 determines as appropriate a steering torque TQs required to cause the driver's vehicle 100 to travel along a target avoidance path Rtgt as the requested steering torque TQs_req regardless of the steering angle θ steer or the like. Then, the ECU 90 controls the operation of the steering device 23 to output the requested steering torque TQs_req.

Longitudinal Acceleration Sensor

The longitudinal acceleration sensor 52 detects an acceleration of the driver's vehicle 100 in a fore-and-aft direction. The longitudinal acceleration sensor 52 is electrically connected to the ECU 90. The longitudinal acceleration sensor 52 transmits information on the detected acceleration to the ECU 90. The ECU 90 acquires the acceleration of the driver's vehicle 100 in the fore-and-aft direction as a longitudinal acceleration Gx based on the information.

Lateral Acceleration Sensor

The lateral acceleration sensor 53 detects an acceleration of the driver's vehicle 100 in a lateral direction (width direction). The lateral acceleration sensor 53 is electrically connected to the ECU 90. The lateral acceleration sensor 53 transmits information on the detected acceleration to the ECU 90. The ECU 90 acquires the acceleration of the driver's vehicle 100 in the lateral direction as a lateral acceleration Gy based on the information.

Yaw Rate Sensor

The yaw rate sensor 54 detects a yaw rate YR of the driver's vehicle 100. The yaw rate sensor 54 is electrically connected to the ECU 90. The yaw rate sensor 54 transmits information on the detected yaw rate YR to the ECU 90. The ECU 90 acquires the yaw rate YR of the driver's vehicle 100 based on the information.

Peripheral Information Detection Device

The peripheral information detection device 60 detects information around the driver's vehicle 100, and includes a radio wave sensor 61 and an image sensor 62 in this example. Examples of the radio wave sensor 61 include a radar sensor (such as a millimeter wave radar). Examples of the image sensor 62 include a camera. The peripheral information detection device 60 may include an acoustic wave sensor such as an ultrasonic sensor (clearance sonar) or an optical sensor such as a laser radar (light detection and ranging (LiDAR)).

Radio Wave Sensor

The radio wave sensor 61 is electrically connected to the ECU 90. The radio wave sensor 61 emits a radio wave, and receives the radio wave reflected by an object (reflected wave). The radio wave sensor 61 transmits information (detection result) related to the emitted radio wave and the received radio wave (reflected wave) to the ECU 90. In other words, the radio wave sensor 61 detects an object present around the driver's vehicle 100, and transmits information (detection result) related to the detected object to the ECU 90. The ECU 90 can acquire information related to the object present around the driver's vehicle 100 (object information I_O) based on the information (radio wave information I_RO).

In this example, the object is a vehicle, a motorcycle, a bicycle, a person, or the like.

Image Sensor

The image sensor 62 is electrically connected to the ECU 90. The image sensor 62 captures an image around the driver's vehicle 100, and transmits information related to the captured image to the ECU 90. The ECU 90 can acquire information related to the periphery of the driver's vehicle 100 (peripheral detection information Idct) based on the information (image information I_C).

Figure 2:
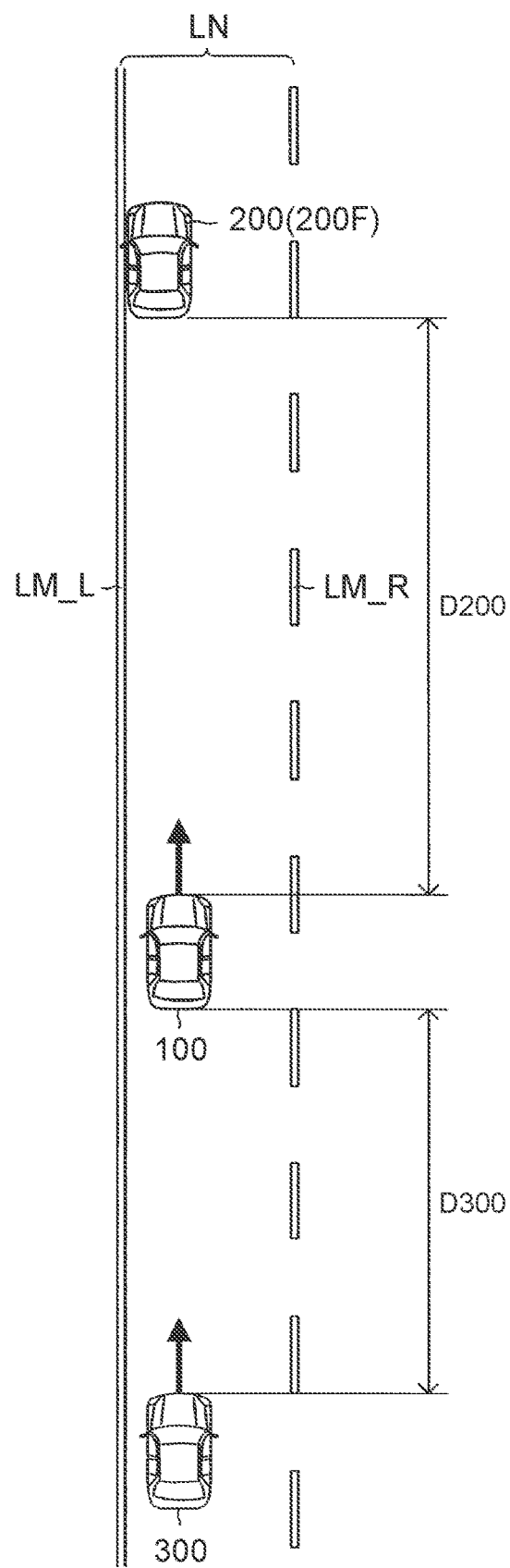
FIG. 2 is a diagram illustrating, for example, a distance between the driver's vehicle and an object (vehicle) ahead of the driver's vehicle and a distance between the driver's vehicle and an object (vehicle) behind the driver's vehicle.

When an object (forward object 200F) is present ahead of the driver's vehicle 100 as illustrated in FIG. 2, the ECU 90 detects the forward object 200F based on the peripheral detection information Idct. The forward object 200F is a vehicle, a motorcycle, a bicycle, a person, or the like. In the example illustrated in FIG. 2, the forward object 200F is a vehicle.

When the ECU 90 detects the forward object 200F, the ECU 90 can acquire, for example, "a distance between the forward object 200F and the driver's vehicle 100 (object distance D200)" and "a speed of the driver's vehicle 100 relative to the forward object 200F (relative speed ΔV200)" based on the peripheral detection information Idct.

When an object moving behind the driver's vehicle 100 to follow the driver's vehicle 100 in the same direction as a traveling direction of the driver's vehicle 100 (succeeding moving object 300) is present as illustrated in FIG. 2, the ECU 90 detects the succeeding moving object 300 based on the peripheral detection information Idct. The succeeding moving object 300 is a vehicle, a motorcycle, a bicycle, a person, or the like. In the example illustrated in FIG. 2, the succeeding moving object 300 is a vehicle.

When the ECU 90 detects the succeeding moving object 300, the ECU 90 can acquire, for example, "a distance between the succeeding moving object 300 and the driver's vehicle 100 (object distance D300)" and "a speed of the succeeding moving object 300 relative to the driver's vehicle 100 (relative speed ΔV300)" based on the peripheral detection information Idct.

The ECU 90 recognizes "a right lane marking line LM_R and a left lane marking line LM_L defining a traveling lane (driver's vehicle lane LN) of the driver's vehicle 100" based on the peripheral detection information Idct. The ECU 90 can determine a range of the driver's vehicle lane LN based on the recognized right and left lane marking lines LM (that is, the right lane marking line LM_R and the left lane marking line LM_L).

Seating Sensor

The seating sensor 71 detects an occupant sitting on a seat of the driver's vehicle 100, and is mounted on the driver's vehicle 100 in association with each seat. The seating sensor 71 is electrically connected to the ECU 90. When the seating sensor 71 detects the occupant sitting on the seat, the seating sensor 71 transmits, to the ECU 90, a signal indicating that the occupant is sitting on the seat. The ECU 90 acquires the number of occupants of the driver's vehicle 100 based on the signal.

Outline of Operation of Vehicle Collision Avoidance Assistance Device

Next, an outline of an operation of the vehicle collision avoidance assistance device 10 will be described. The vehicle collision avoidance assistance device 10 is configured to execute forced braking or forced steering when the driver's vehicle 100 may collide with an object ahead of the driver's vehicle 100 (forward object).

Forced Braking

Figure 3A:
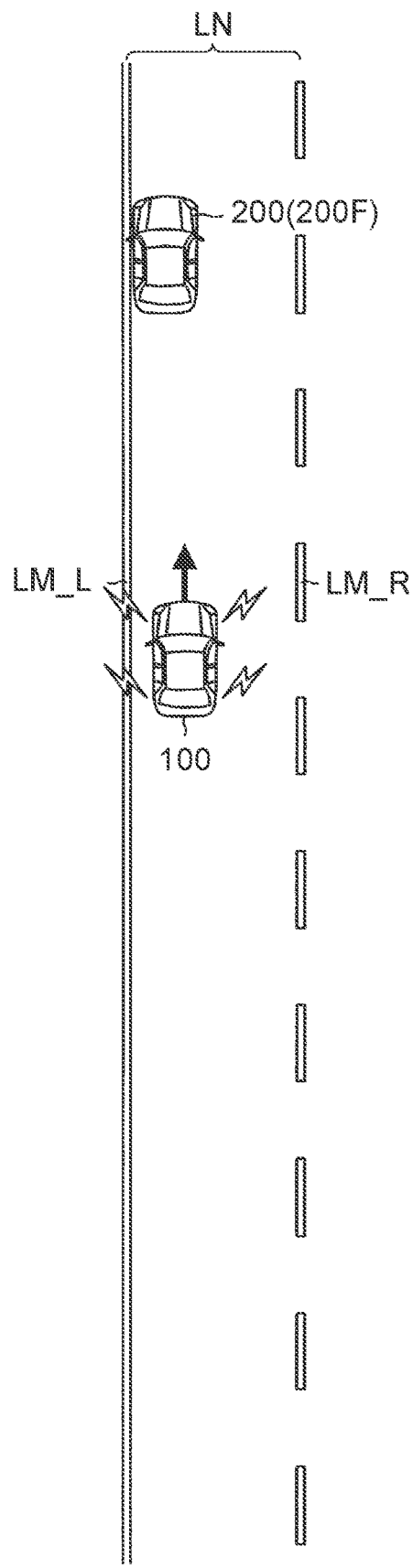
FIG. 3A is a diagram illustrating a scene in which the driver's vehicle is decelerated by forced braking.
Figure 3B:
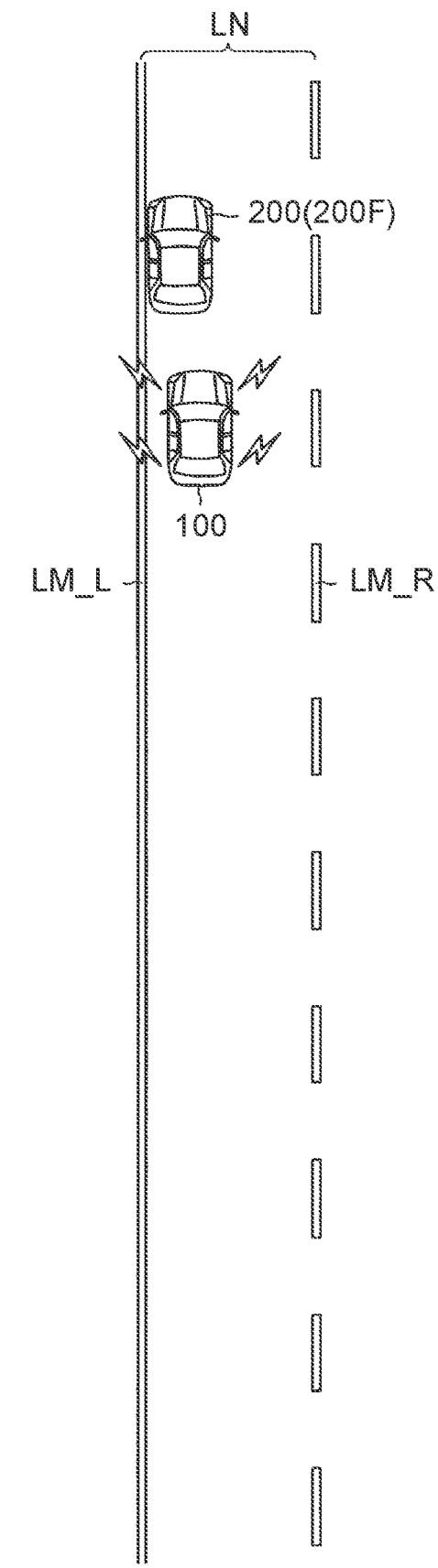
FIG. 3B is a diagram illustrating a scene in which the driver's vehicle is stopped by forced braking.

When the forward object 200F (in an example illustrated in FIGS. 3A and 3B, a vehicle stopped ahead of the driver's vehicle 100) is present as illustrated in FIG. 3A, the forced braking is performed to avoid the collision between the driver's vehicle 100 and the forward object 200F by applying a braking force to the driver's vehicle 100 to stop the driver's vehicle 100 before the driver's vehicle 100 collides with the forward object 200F as illustrated in FIG. 3B. The forced braking is terminated when the driver's vehicle 100 is stopped behind the forward object 200F.

Forced Steering

Figure 4A:
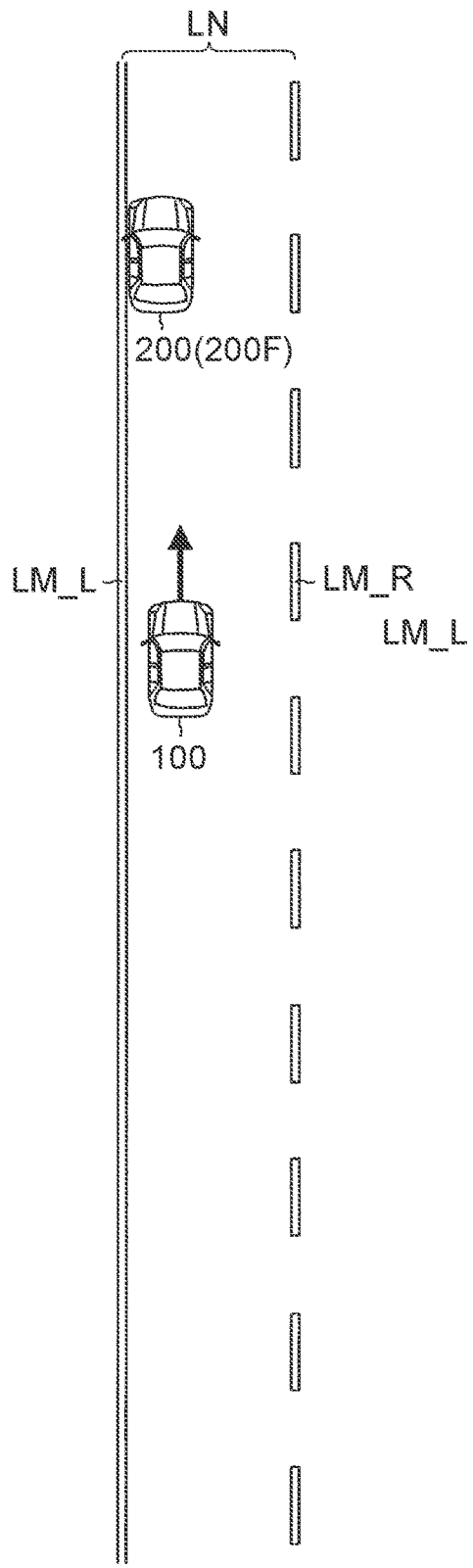
FIG. 4A is a diagram illustrating a scene in which forced steering is started.
Figure 4B:
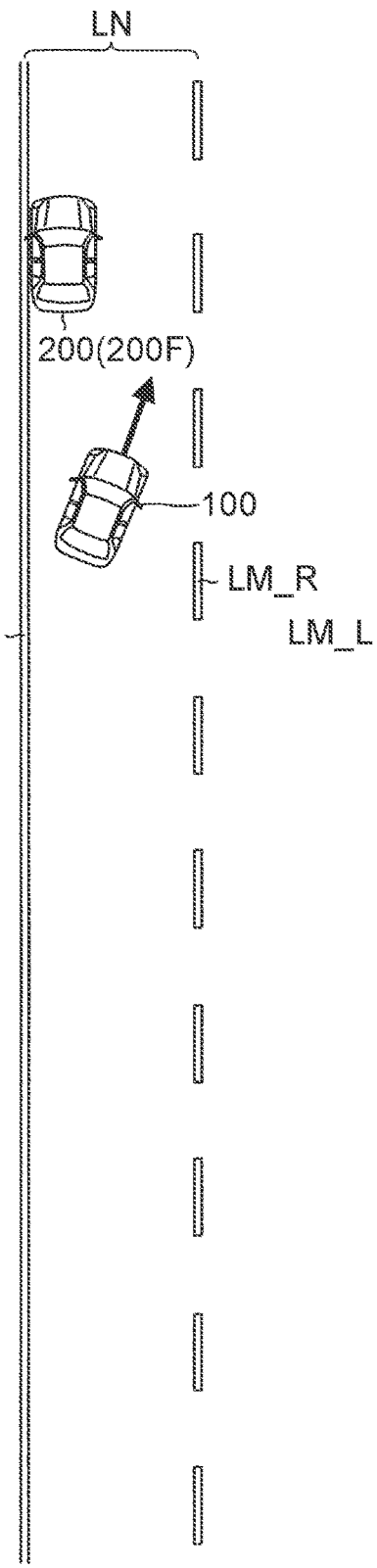
FIG. 4B is a diagram illustrating a scene in which the driver's vehicle is turned by forced steering.
Figure 4C:
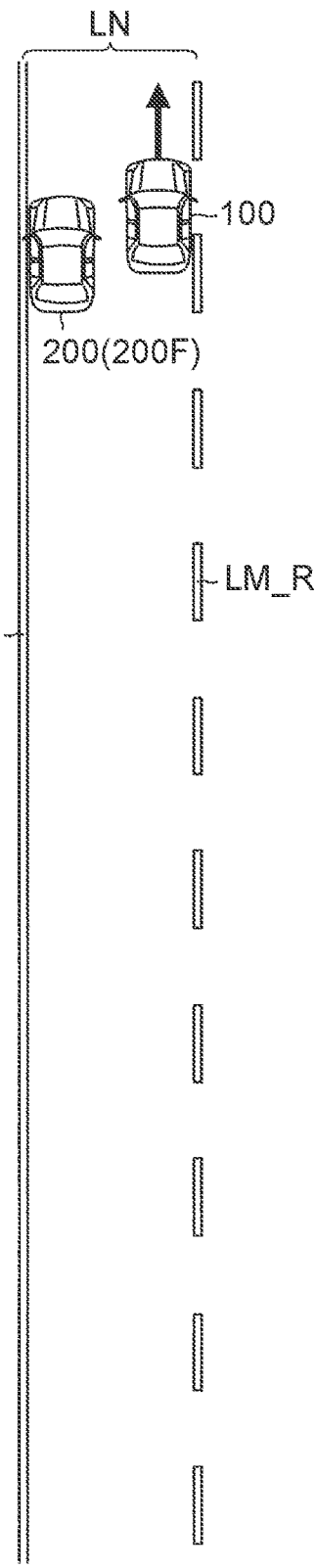
FIG. 4C is a diagram illustrating a scene in which the driver's vehicle passes by the side of an object by forced steering.

When the forward object 200F ahead of the driver's vehicle 100 (in an example illustrated in FIGS. 4A, 4B, and 4C, a vehicle stopped ahead of the driver's vehicle 100) is present as illustrated in FIG. 4A, the forced steering is performed to avoid the collision between the driver's vehicle 100 and the forward object 200F by steering the driver's vehicle 100 as illustrated in FIG. 4B to pass by the side of the forward object 200F as illustrated in FIG. 4C. The forced steering is terminated when the driver's vehicle 100 passes by the side of the forward object 200F.

Request Condition/Forbiddance Condition

The vehicle collision avoidance assistance device 10 acquires information related to conditions of the driver's vehicle 100 (driver's vehicle information I_100) and information related to a situation around the driver's vehicle 100 (driver's vehicle peripheral information I_S), and determines whether a condition for requesting execution of forced steering (request condition Creq) is satisfied and whether a condition for forbidding the execution of forced steering (forbiddance condition Cfbd) is satisfied based on the driver's vehicle information I_100 and the driver's vehicle peripheral information I_S.

The vehicle collision avoidance assistance device 10 may acquire the driver's vehicle information I_100 or the driver's vehicle peripheral information I_S, and determine whether the request condition Creq is satisfied and whether the forbiddance condition Cfbd is satisfied based on the acquired driver's vehicle information I_100 or the acquired driver's vehicle peripheral information I_S.

Deterioration Status of Braking Device

The vehicle collision avoidance assistance device 10 acquires a deterioration status of the braking device 22 as the driver's vehicle information I_100 while the driver's vehicle 100 is traveling, and determines whether the request condition Creq is satisfied based on the deterioration status of the braking device 22.

The deterioration status of the braking device 22 can be grasped by grasping the braking performance of the braking device 22. The braking performance of the braking device 22 can be grasped by grasping a relationship between a brake pedal operation amount BP and a braking force thus applied to the driver's vehicle 100 from the braking device 22. The braking force applied to the driver's vehicle 100 from the braking device 22 appears as a deceleration of the driver's vehicle 100 (that is, a negative longitudinal acceleration Gx; hereinafter referred to as "deceleration GD").

To accurately acquire the deterioration status of the braking device 22, the vehicle collision avoidance assistance device 10 first determines whether the vehicle speed V100 of the driver's vehicle 100 is equal to or higher than a predetermined vehicle speed (reference vehicle speed or lower limit vehicle speed Vlimit) and the absolute value of a road surface gradient GR is equal to or smaller than a predetermined gradient (reference gradient or upper limit gradient GRlimit) (that is, whether a braking performance determination condition is satisfied).

When the braking performance determination condition is satisfied, the vehicle collision avoidance assistance device 10 determines whether the brake pedal operation amount BP is equal to or larger than a predetermined brake pedal operation amount BPth.

When the vehicle collision avoidance assistance device 10 determines that the brake pedal operation amount BP is equal to or larger than the predetermined brake pedal operation amount BPth, the vehicle collision avoidance assistance device 10 acquires the deceleration GD of the driver's vehicle 100 at that time as the driver's vehicle information I_100, and determines whether the absolute value of the deceleration GD is equal to or smaller than a predetermined deceleration (reference deceleration GDbase) set based on the brake pedal operation amount BP. The reference deceleration GDbase is set to a deceleration that is expected to be generated in the driver's vehicle 100 based on the brake pedal operation amount BP when the braking device 22 has sufficient braking performance.

When the vehicle collision avoidance assistance device 10 determines that the absolute value of the deceleration GD of the driver's vehicle 100 is equal to or smaller than the reference deceleration GDbase, the vehicle collision avoidance assistance device 10 may determine that the request condition Creq due to the braking performance (first request condition Creq_1) is satisfied. In this example, however, the vehicle collision avoidance assistance device 10 increases, by a predetermined value, an index value indicating a possibility that the first request condition Creq_1 is satisfied (braking performance index value). When the vehicle collision avoidance assistance device 10 determines that the absolute value of the deceleration GD of the driver's vehicle 100 is larger than the reference deceleration GDbase, the vehicle collision avoidance assistance device 10 may determine that the first request condition Creq_1 is not satisfied. In this example, however, the vehicle collision avoidance assistance device 10 reduces the braking performance index value by a predetermined value.

The vehicle collision avoidance assistance device 10 employs a braking performance counter Cbrake as the braking performance index value. When the vehicle collision avoidance assistance device 10 determines that the absolute value of the deceleration GD of the driver's vehicle 100 is equal to or smaller than the reference deceleration GDbase, the vehicle collision avoidance assistance device 10 increments the braking performance counter Cbrake. When the vehicle collision avoidance assistance device 10 determines that the absolute value of the deceleration GD of the driver's vehicle 100 is larger than the reference deceleration GDbase, the vehicle collision avoidance assistance device 10 decrements the braking performance counter Cbrake.

The vehicle collision avoidance assistance device 10 determines that the first request condition Creq_1 is not satisfied when the braking performance counter Cbrake is smaller than a predetermined value Cbrake_th, and determines that the first request condition Creq_1 is satisfied when the braking performance counter Cbrake reaches the predetermined value Cbrake_th.

When a brake pad used in the braking device 22 deteriorates, the braking performance of the braking device 22 decreases, and as a result, the deceleration GD of the driver's vehicle 100 decreases. Therefore, the determination as to whether the first request condition Creq_1 is satisfied based on the deceleration GD of the driver's vehicle 100 corresponds to the determination as to whether the first request condition Creq_1 is satisfied based on the deterioration status of the brake pad that is acquired as the driver's vehicle information I_100.

Also when brake oil used in the braking device 22 deteriorates, the braking performance of the braking device 22 decreases, and as a result, the deceleration GD of the driver's vehicle 100 decreases. Therefore, the determination as to whether the first request condition Creq_1 is satisfied based on the deceleration GD of the driver's vehicle 100 corresponds to the determination as to whether the first request condition Creq_1 is satisfied based on the deterioration status of the brake oil that is acquired as the driver's vehicle information I_100.

When the weight of the driver's vehicle 100 including an occupant increases, the deceleration GD of the driver's vehicle 100 decreases even if the braking performance of the braking device 22 does not decrease. Therefore, the determination as to whether the first request condition Creq_1 is satisfied based on the deceleration GD of the driver's vehicle 100 corresponds to the determination as to whether the first request condition Creq_1 is satisfied based on whether the weight of the driver's vehicle 100 including an occupant that is acquired as the driver's vehicle information I_100 is equal to or larger than a predetermined weight.

When the weight of the driver's vehicle 100 including an occupant increases as described above, the deceleration GD of the driver's vehicle 100 decreases even if the braking performance of the braking device 22 does not decrease. That is, when the number of occupants in the driver's vehicle 100 increases, the deceleration GD of the driver's vehicle 100 decreases even if the braking performance of the braking device 22 does not decrease. Therefore, the vehicle collision avoidance assistance device 10 may acquire the number of occupants of the driver's vehicle 100 as the driver's vehicle information I_100, determine that the request condition Creq is satisfied when the acquired number of occupants is equal to or larger than a predetermined number, and determine that the request condition Creq is not satisfied when the acquired number of occupants is smaller than the predetermined number.

Master Cylinder Pressure

When an abnormality occurs in the master cylinder, the master cylinder pressure Pm decreases, and as a result, the braking performance of the braking device 22 decreases. Therefore, the vehicle collision avoidance assistance device 10 acquires the master cylinder pressure Pm as the driver's vehicle information I_100, and determines whether the master cylinder pressure Pm is equal to or lower than a predetermined pressure Pm_th.

When the vehicle collision avoidance assistance device 10 determines that the master cylinder pressure Pm is equal to or lower than the predetermined pressure Pm_th, the vehicle collision avoidance assistance device 10 determines that the request condition Creq due to the braking performance (second request condition Creq_2) is satisfied. When the vehicle collision avoidance assistance device 10 determines that the master cylinder pressure Pm is higher than the predetermined pressure Pm_th, the vehicle collision avoidance assistance device 10 determines that the second request condition Creq_2 is not satisfied.

Road Surface Condition

The vehicle collision avoidance assistance device 10 acquires, as the driver's vehicle peripheral information I_S, information related to a road surface where the driver's vehicle 100 is traveling (road surface information Iroad) while the driver's vehicle 100 is traveling, and determines whether the forbiddance condition Cfbd is satisfied based on the road surface information Iroad.

Even when the forced braking is performed while the driver's vehicle 100 is traveling on a downhill with a large gradient, there is a possibility that the driver's vehicle 100 is not decelerated as expected. In such a case, it is preferable to avoid the collision between the driver's vehicle 100 and the object by forced steering instead of the forced braking.

When the forced steering is performed while the driver's vehicle 100 is traveling on a road surface having a large cant, the traveling behavior of the driver's vehicle 100 may become unstable.

To accurately acquire the road surface gradient GR and a road surface cant CT, the vehicle collision avoidance assistance device 10 first determines whether an absolute value of the acceleration of the driver's vehicle 100 (that is, the longitudinal acceleration Gx including a negative value) is equal to or smaller than a predetermined acceleration (upper limit acceleration Glimit) (that is, whether a road surface determination condition is satisfied).

When the vehicle collision avoidance assistance device 10 determines that the road surface determination condition is satisfied, the vehicle collision avoidance assistance device 10 acquires the road surface gradient GR and the road surface cant CT as the driver's vehicle peripheral information I_S. The road surface gradient GR and the road surface cant CT can be acquired by a predetermined method based on the peripheral detection information Idct.

The vehicle collision avoidance assistance device 10 determines whether the road surface gradient GR is smaller than zero and its absolute value is equal to or larger than a predetermined gradient (first gradient GR_1), and whether the absolute value of the road surface cant CT is equal to or larger than a predetermined value (predetermined cant CTth).

When the vehicle collision avoidance assistance device 10 determines that the road surface gradient GR is smaller than zero and its absolute value is equal to or larger than the first gradient GR_1, the vehicle collision avoidance assistance device 10 determines that the request condition Creq due to the road surface gradient (third request condition Creq_3) is satisfied. When the vehicle collision avoidance assistance device 10 determines that the road surface gradient GR is equal to or larger than zero or its absolute value is smaller than the first gradient GR_1 though the road surface gradient GR is smaller than zero, the vehicle collision avoidance assistance device 10 determines that the third request condition Creq_3 is not satisfied.

When the absolute value of the road surface cant CT is equal to or larger than the predetermined cant CTth, the vehicle collision avoidance assistance device 10 determines that the forbiddance condition Cfbd due to the road surface cant (first forbiddance condition Cfbd_1) is satisfied. When the absolute value of the road surface cant CT is smaller than the predetermined cant CTth, the vehicle collision avoidance assistance device 10 determines that the first forbiddance condition Cfbd_1 is not satisfied.

When the forced steering is performed while the driver's vehicle 100 is traveling on a road surface having a small coefficient of friction, the traveling behavior of the driver's vehicle 100 may become unstable. In such a case, it is preferable to avoid the collision between the driver's vehicle 100 and the object by forced braking instead of the forced steering.

Therefore, the vehicle collision avoidance assistance device 10 may acquire a road surface friction coefficient in addition to the road surface gradient GR as the driver's vehicle peripheral information I_S, and determine whether the third request condition Creq_3 is satisfied based on the road surface gradient GR and the road surface friction coefficient, instead of determining whether the third request condition Creq_3 is satisfied based only on the road surface gradient GR. The road surface friction coefficient can be acquired by a predetermined method based on the peripheral detection information Idct.

When the road surface friction coefficient is equal to or smaller than a predetermined friction coefficient µ_th and determination is made that the road surface gradient GR is smaller than zero and its absolute value is equal to or larger than the first gradient GR_1, the vehicle collision avoidance assistance device 10 determines that the request condition Creq due to the road surface gradient (third request condition Creq_3) is satisfied. When the road surface friction coefficient µ is equal to or smaller than a predetermined friction coefficient µ_th and determination is made that the road surface gradient GR is equal to or larger than zero or its absolute value is smaller than the first gradient GR_1 though the road surface gradient GR is smaller than zero, the vehicle collision avoidance assistance device 10 determines that the third request condition Creq_3 is not satisfied.

When the road surface friction coefficient is larger than the predetermined friction coefficient µ_th, the road surface gradient GR is smaller than zero, and its absolute value is equal to or larger than the first gradient GR_1 and equal to or smaller than a predetermined gradient (second gradient GR_2) that is larger than the first gradient GR_1, the vehicle collision avoidance assistance device 10 determines that the third request condition Creq_3 is satisfied. When the road surface friction coefficient µ is larger than the predetermined friction coefficient µ_th and the road surface gradient GR is equal to or larger than zero or its absolute value is smaller than the first gradient GR_1 or larger than the second gradient GR_2 though the road surface gradient GR is smaller than zero, the vehicle collision avoidance assistance device 10 determines that the third request condition Creq_3 is not satisfied.

Whether Vehicle Stability Control is Performed

When the traveling behavior of the driver's vehicle 100 is unstable while the driver's vehicle 100 is traveling, the vehicle collision avoidance assistance device 10 performs so-called vehicle stability control for stabilizing the traveling behavior of the driver's vehicle 100 by adjusting the driving force or the braking force to be applied to each wheel of the driver's vehicle 100 so that the traveling behavior of the driver's vehicle 100 stabilizes.

When the vehicle stability control is performed, the vehicle collision avoidance assistance device 10 determines that the forbiddance condition Cfbd due to the vehicle stability control (second forbiddance condition Cfbd_2) is satisfied. When the vehicle stability control is not performed, the vehicle collision avoidance assistance device 10 determines that the second forbiddance condition Cfbd_2 is not satisfied. In this way, the vehicle collision avoidance assistance device 10 acquires, as the driver's vehicle information I_100, information on whether the vehicle stability control is performed, and determines whether the forbiddance condition Cfbd is satisfied based on whether the vehicle stability control is performed.

Collision Avoidance Execution Condition

While the driver's vehicle 100 is traveling, the vehicle collision avoidance assistance device 10 performs a process for detecting an object such as a vehicle ahead of the driver's vehicle 100 in the traveling direction based on the peripheral detection information Idct. The vehicle collision avoidance assistance device 10 executes normal traveling control while the vehicle collision avoidance assistance device 10 does not detect an object ahead of the driver's vehicle 100 in the traveling direction.

In the normal traveling control, when the requested drive torque TQ_D_req (requested driving force) is larger than zero, the operation of the drive device 21 is controlled to output the requested drive torque TQ_D_req from the drive device 21. When the requested braking torque TQ_B_req (requested braking force) is larger than zero, the operation of the braking device 22 is controlled to output the requested braking torque TQ_B_req from the braking device 22. When the requested steering torque TQs_req (requested steering force) is larger than zero, the operation of the steering device 23 is controlled to output the requested steering torque TQs_req from the steering device 23.

When the vehicle collision avoidance assistance device 10 detects an object ahead of the driver's vehicle 100 in the traveling direction, the vehicle collision avoidance assistance device 10 determines whether the object is present in a predicted traveling area A100 based on the peripheral detection information Idct.

Figure 5A:
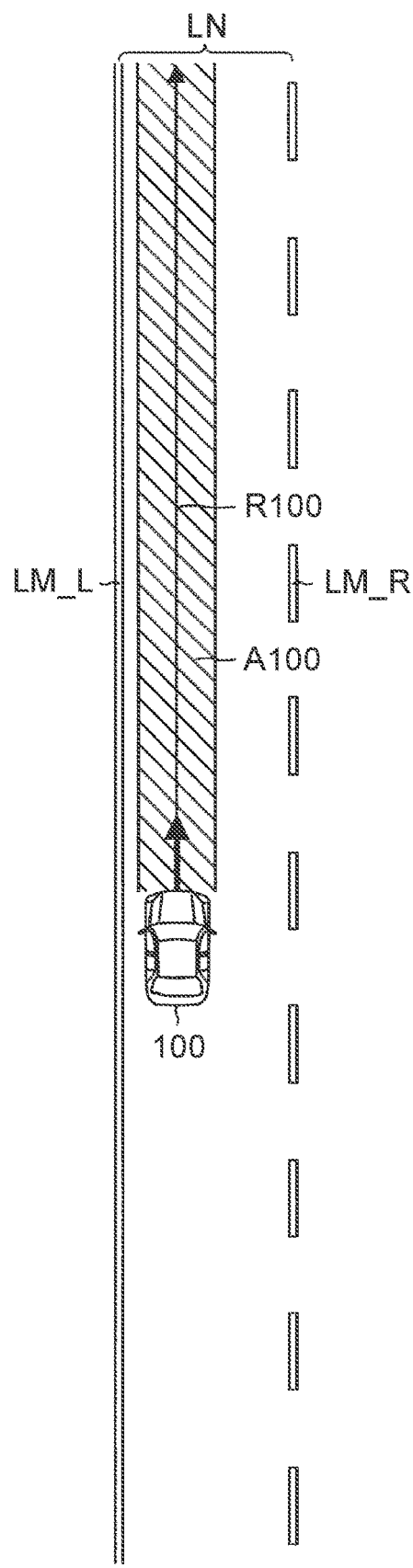
FIG. 5A is a diagram illustrating a predicted traveling area of the driver's vehicle.

As illustrated in FIG. 5A, the predicted traveling area A100 is an area having a width equal to the width of the driver's vehicle 100 with its center corresponding to a predicted traveling route R100 of the driver's vehicle 100. The predicted traveling route R100 is a traveling route where the driver's vehicle 100 is predicted to travel in the future when the driver's vehicle 100 travels while keeping the steering angle θ steer at that time. The predicted traveling route R100 illustrated in FIG. 5A is a straight line, but may be a curved line depending on situations.

When the detected object is not present in the predicted traveling area A100, the vehicle collision avoidance assistance device 10 continues the normal traveling control.

Figure 5B:
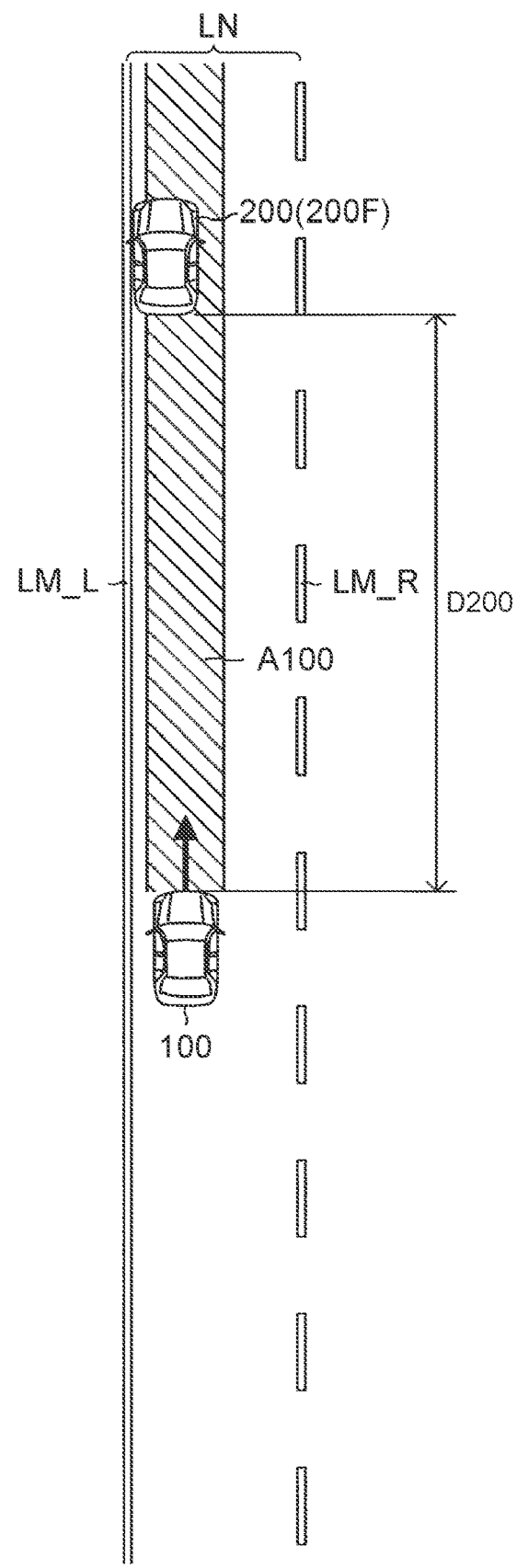
FIG. 5B is a diagram illustrating a scene in which an object (vehicle) is present in the predicted traveling area of the driver's vehicle.

When an object 200 (in an example illustrated in FIG. 5B, a vehicle) is present in the predicted traveling area A100 as illustrated in FIG. 5B, the vehicle collision avoidance assistance device 10 recognizes the object 200 as the forward object 200F, and acquires "a distance between the forward object 200F and the driver's vehicle 100 (object distance D200)" and "a speed of the driver's vehicle 100 relative to the forward object 200F (relative speed ΔV200)" based on the peripheral detection information Idet.

The vehicle collision avoidance assistance device 10 acquires a predicted reach period TTC by calculation based on the acquired object distance D200 and the acquired relative speed ΔV200.

The predicted reach period TTC is a period that the driver's vehicle 100 is predicted to require to reach the forward object 200F. The vehicle collision avoidance assistance device 10 acquires the predicted reach period TTC by dividing the object distance D200 by the relative speed ΔV200 (TTC=D200/ΔV200). The vehicle collision avoidance assistance device 10 acquires the object distance D200, the relative speed ΔV200, and the predicted reach period TTC in a predetermined calculation cycle while determining that the forward object 200F is present in the predicted traveling area A100.

The predicted reach period TTC decreases as the driver's vehicle 100 approaches the forward object 200F when the relative speed ΔV200 is constant.

The vehicle collision avoidance assistance device 10 continues the normal traveling control while the predicted reach period TTC is longer than a predetermined predicted reach period TTCth.

When the driver's vehicle 100 then approaches the forward object 200F and the predicted reach period TTC decreases to a predetermined period (predetermined predicted reach period TTCth) as illustrated in FIG. 6A, the vehicle collision avoidance assistance device 10 determines that a collision avoidance execution condition Cstart is satisfied.

That is, the vehicle collision avoidance assistance device 10 acquires the predicted reach period TTC as an index value indicating a possibility that the driver's vehicle 100 collides with the forward object 200F, and determines that the collision avoidance execution condition Cstart is satisfied when the index value is equal to or larger than a predetermined index value. In this case, the index value indicating the possibility that the driver's vehicle 100 collides with the forward object 200F increases as the predicted reach period TTC decreases.

Acquisition of Target Avoidance Path

When the vehicle collision avoidance assistance device 10 determines that the collision avoidance execution condition Cstart is satisfied, the vehicle collision avoidance assistance device 10 sets a target avoidance path Rtgt as illustrated in FIG. 6B. The target avoidance path Rtgt is a traveling path of the driver's vehicle 100 where the driver's vehicle 100 can pass by the side of the forward object 200F while traveling in the driver's vehicle lane LN.

In the example illustrated in FIG. 6B, the target avoidance path Rtgt is a path extending by a right side of the forward object 200F. When a space where the driver's vehicle 100 can pass by the side of the forward object 200F while traveling in the driver's vehicle lane LN is present on a left side of the forward object 200F, a path extending by the left side of the forward object 200F may be acquired as the target avoidance path Rtgt.

When the vehicle collision avoidance assistance device 10 cannot set the target avoidance path Rtgt because the space where the driver's vehicle 100 will pass is not present on the side of the forward object 200F, the vehicle collision avoidance assistance device 10 determines that the forbiddance condition Cfbd due to the collision avoidance path (third forbiddance condition Cfbd_3) is satisfied. When the target avoidance path Rtgt can be set, the vehicle collision avoidance assistance device 10 determines that the third forbiddance condition Cfbd_3 is not satisfied. In this way, the vehicle collision avoidance assistance device 10 acquires, as the driver's vehicle information I_100, the result of the determination as to whether the target avoidance path Rtgt can be set, and determines whether the third forbiddance condition Cfbd_3 is satisfied based on the determination result.

Target Deceleration Setting

When the vehicle collision avoidance assistance device 10 determines that the collision avoidance execution condition Cstart is satisfied, the vehicle collision avoidance assistance device 10 acquires, by calculation, a deceleration of the driver's vehicle 100 (target deceleration GDtgt) required to stop the driver's vehicle 100 by forced braking before colliding with the forward object 200F.

Acquisition of Succeeding Moving Object Information

When the vehicle collision avoidance assistance device 10 determines that the collision avoidance execution condition Cstart is satisfied, the vehicle collision avoidance assistance device 10 determines whether the succeeding moving object 300 is present based on the peripheral detection information Idct.

As illustrated in FIG. 7A, the vehicle collision avoidance assistance device 10 determines that the succeeding moving object 300 is not present when no object is present behind the driver's vehicle 100. When the succeeding moving object 300 is not present, the succeeding moving object 300 does not collide with the driver's vehicle 100 even if the forced braking is performed, and there is no need to avoid the collision between the driver's vehicle 100 and the forward object 200F by forced steering. Therefore, the vehicle collision avoidance assistance device 10 determines that the request condition Creq due to the succeeding moving object (fourth request condition Creq_4) is not satisfied.

When an object (in an example illustrated in FIG. 7B, a vehicle) is present behind the driver's vehicle 100 as illustrated in FIG. 7B, the vehicle collision avoidance assistance device 10 determines that the succeeding moving object 300 is present, and acquires a predicted moving area A300 of the succeeding moving object 300 based on the peripheral detection information Idct.

As illustrated in FIG. 7B, the predicted moving area A300 is an area having a width equal to the width of the succeeding moving object 300 with its center corresponding to a predicted moving route R300 of the succeeding moving object 300. The predicted moving route R300 is a traveling route where the succeeding moving object 300 is predicted to travel in the future. The predicted moving route R300 illustrated in FIG. 7B is a straight line, but may be a curved line depending on situations.

The vehicle collision avoidance assistance device 10 determines whether the predicted moving area A300 and the predicted traveling area A100 overlap each other.

Figure 8A:
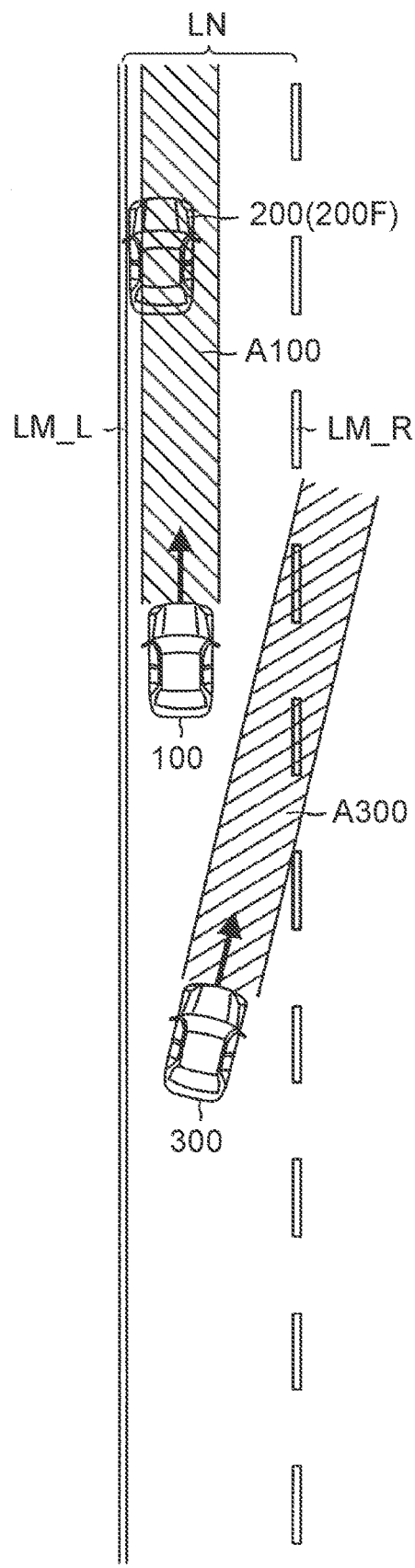
FIG. 8A is a diagram illustrating a scene in which a predicted moving area of a succeeding moving object and the predicted traveling area of the driver's vehicle do not overlap each other.

When the predicted moving area A300 and the predicted traveling area A100 have a relationship illustrated in FIG. 8A, the vehicle collision avoidance assistance device 10 determines that the predicted moving area A300 and the predicted traveling area A100 do not overlap each other. When the predicted moving area A300 and the predicted traveling area A100 do not overlap each other, the succeeding moving object 300 does not collide with the driver's vehicle 100 even if the forced braking is performed, and there is no need to avoid the collision between the driver's vehicle 100 and the forward object 200F by forced steering. Therefore, the vehicle collision avoidance assistance device 10 determines that the fourth request condition Creq_4 is not satisfied.

Figure 8B:
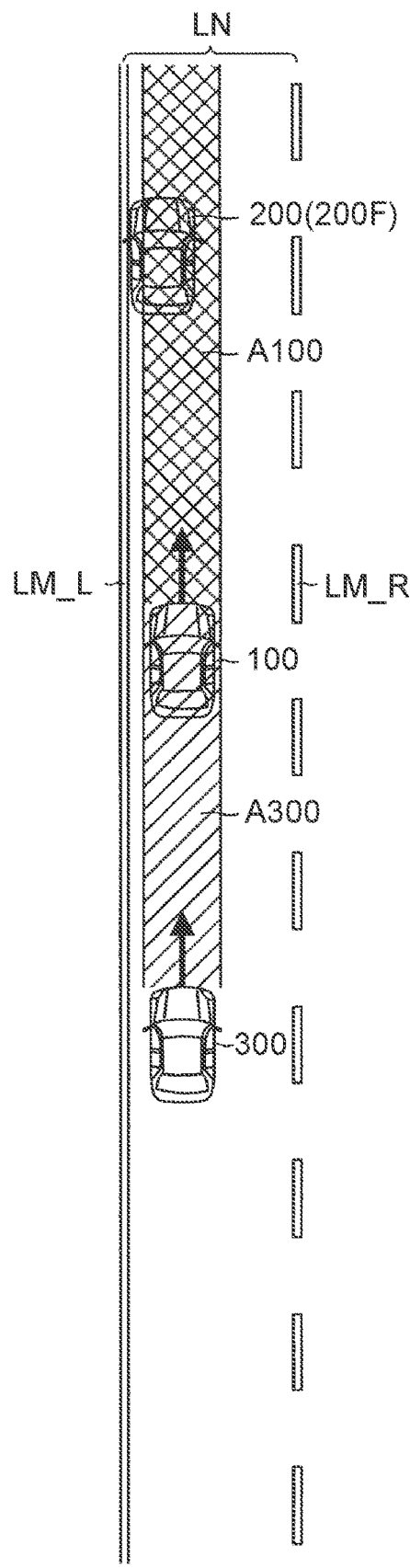
FIG. 8B is a diagram illustrating a scene in which the predicted moving area of the succeeding moving object and the predicted traveling area of the driver's vehicle overlap each other.

When the predicted moving area A300 and the predicted traveling area A100 have a relationship illustrated in FIG. 8B, the vehicle collision avoidance assistance device 10 determines that the predicted moving area A300 and the predicted traveling area A100 overlap each other, and determines, based on the peripheral detection information Idct, whether the succeeding moving object 300 may collide with the driver's vehicle 100 under the assumption that the forced braking is performed.

More specifically, the vehicle collision avoidance assistance device 10 acquires, by calculation, a distance by which the succeeding moving object 300 moves before the succeeding moving object 300 is stopped (required stop distance Dreq_stop) under the assumption that the succeeding moving object 300 starts decelerating at a maximum deceleration GDmax in response to the start of deceleration of the driver's vehicle 100 when a predetermined period Tth has elapsed since the driver's vehicle 100 started decelerating at the target deceleration GDtgt by starting forced braking. The predetermined period Tth is a period that may generally be required for the succeeding moving object 300 to start decelerating in response to the start of deceleration of the driver's vehicle 100. The maximum deceleration GDmax is the maximum value of the deceleration that can be achieved by the succeeding moving object 300.

The vehicle collision avoidance assistance device 10 acquires, by calculation, a period required for the succeeding moving object 300 to move by the required stop distance Dreq_stop (required stop period Treq_stop), and acquires, by calculation, a distance to be traveled by the driver's vehicle 100 within the required stop period Treq_stop during the forced braking (driver's vehicle traveling distance Dtravel).

When the required stop distance Dreq_stop is longer than the driver's vehicle traveling distance Dtravel, the vehicle collision avoidance assistance device 10 may determine that the succeeding moving object 300 may collide with the driver's vehicle 100 in the case where the forced braking is performed. In this example, the vehicle collision avoidance assistance device 10 determines that the succeeding moving object 300 may collide with the driver's vehicle 100 in the case where the forced braking is performed not only when the required stop distance Dreq_stop is longer than the driver's vehicle traveling distance Dtravel, but also when the required stop distance Dreq_stop is equal to or shorter than the driver's vehicle traveling distance Dtravel and a difference ΔD between the two distances is equal to or smaller than a predetermined distance ΔDth.

When the vehicle collision avoidance assistance device 10 determines that the succeeding moving object 300 may collide with the driver's vehicle 100 in the case where the forced braking is performed, it is preferable to avoid the collision between the driver's vehicle 100 and the forward object 200F by forced steering. Therefore, the vehicle collision avoidance assistance device 10 determines that the fourth request condition Creq_4 is satisfied. When the vehicle collision avoidance assistance device 10 determines that the succeeding moving object 300 will not collide with the driver's vehicle 100 even in the case where the forced braking is performed, the vehicle collision avoidance assistance device 10 determines that the fourth request condition Creq_4 is not satisfied.

According to the determination as to whether the fourth request condition Creq_4 is satisfied, the vehicle collision avoidance assistance device 10 determines that the fourth request condition Creq_4 is satisfied when determination is made that the predicted moving area A300 and the predicted traveling area A100 overlap each other and the succeeding moving object 300 is present within a range of a predetermined distance Dth from the driver's vehicle 100 based on the position of the succeeding moving object 300 (relative position P300 of the succeeding moving object 300 to the driver's vehicle 100).

According to the determination as to whether the fourth request condition Creq_4 is satisfied, the vehicle collision avoidance assistance device 10 determines that the fourth request condition Creq_4 is not satisfied when determination is made that the predicted moving area A300 and the predicted traveling area A100 overlap each other and the succeeding moving object 300 is not present within the range of the predetermined distance Dth from the driver's vehicle 100 based on the position of the succeeding moving object 300.

According to the determination as to whether the fourth request condition Creq_4 is satisfied, the vehicle collision avoidance assistance device 10 determines that the fourth request condition Creq_4 is not satisfied when determination is made that the predicted moving area A300 and the predicted traveling area A100 do not overlap each other, regardless of whether the succeeding moving object 300 is present within the range of the predetermined distance Dth from the driver's vehicle 100.

As described above, the vehicle collision avoidance assistance device 10 in this example determines whether the fourth request condition Creq_4 is satisfied based on whether there is a collision possibility that the succeeding moving object 300 collides with the driver's vehicle 100 under the assumption that the forced braking is performed.

Execution of Forced Braking

When none of the first request condition Creq_1 to the fourth request condition Creq_4 is satisfied, the vehicle collision avoidance assistance device 10 performs the forced braking regardless of whether the first forbiddance condition Cfbd_1 to the third forbiddance condition Cfbd_3 are satisfied.

When any one of the first forbiddance condition Cfbd_1 to the third forbiddance condition Cfbd_3 is satisfied, the vehicle collision avoidance assistance device 10 performs the forced braking even if any one of the first request condition Creq_1 to the fourth request condition Creq_4 is satisfied.

When the forced braking is started, the vehicle collision avoidance assistance device 10 controls the braking force to be applied to the driver's vehicle 100 to decelerate the driver's vehicle 100 at the target deceleration GDtgt. The vehicle collision avoidance assistance device 10 terminates the forced braking when the driver's vehicle 100 is stopped.

Execution of Forced Steering

When any one of the first request condition Creq_1 to the fourth request condition Creq_4 is satisfied while none of the first forbiddance condition Cfbd_1 to the third forbiddance condition Cfbd_3 is satisfied, the vehicle collision avoidance assistance device 10 performs the forced steering.

When the forced steering is started, the vehicle collision avoidance assistance device 10 starts a process of controlling the steering torque TQs (steering force) to be output from the steering device 23 to cause the driver's vehicle 100 to travel along the target avoidance path Rtgt.

The vehicle collision avoidance assistance device 10 acquires a current position of the driver's vehicle 100 based on the longitudinal acceleration Gx, the lateral acceleration Gy, the yaw rate YR, the right and left lane marking lines LM, and the like during the forced steering, and controls the steering torque TQs to be output from the steering device 23 to cause the driver's vehicle 100 to travel along the target avoidance path Rtgt based on the acquired current position of the driver's vehicle 100.

Figure 9A:
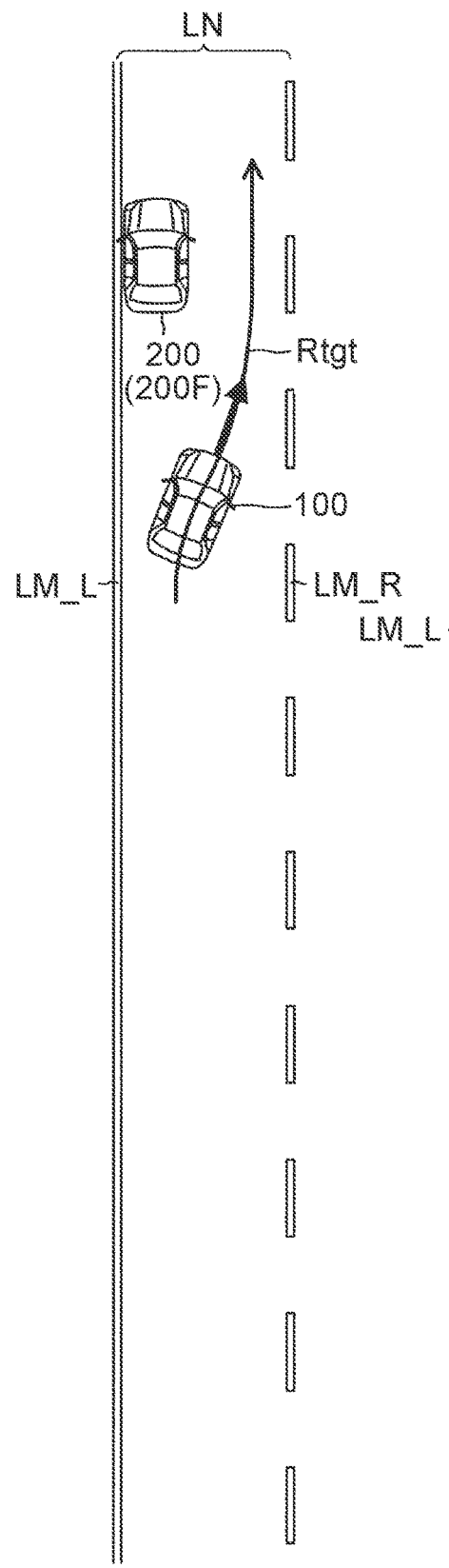
FIG. 9A is a diagram illustrating a scene in which the driver's vehicle starts turning along the target avoidance path by forced steering.
Figure 9B:
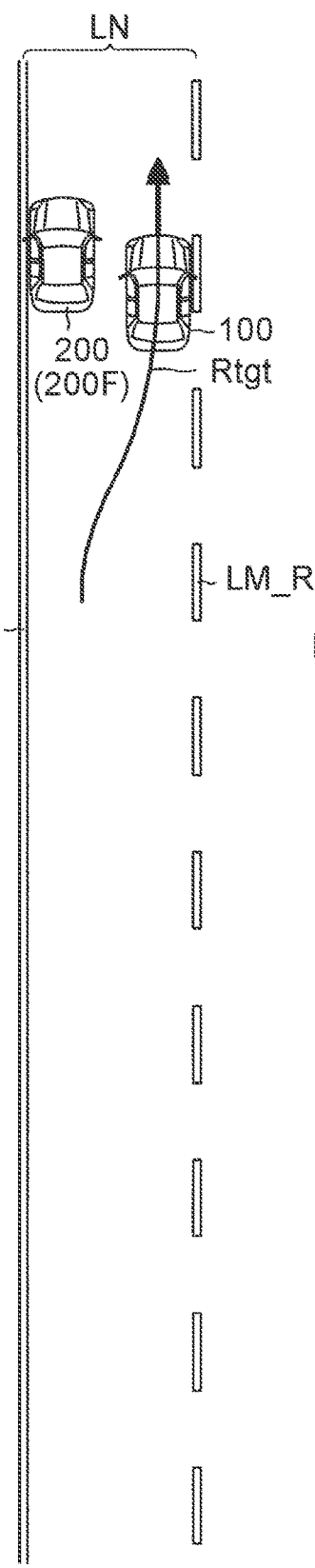
FIG. 9B is a diagram illustrating a scene in which the driver's vehicle passes by the side of a forward object (vehicle) by forced steering.

As a result, the driver's vehicle 100 starts to turn as illustrated in FIG. 9A, and passes by the side of the forward object 200F as illustrated in FIG. 9B. Thus, the collision between the driver's vehicle 100 and the forward object 200F is avoided.

Figure 9C:
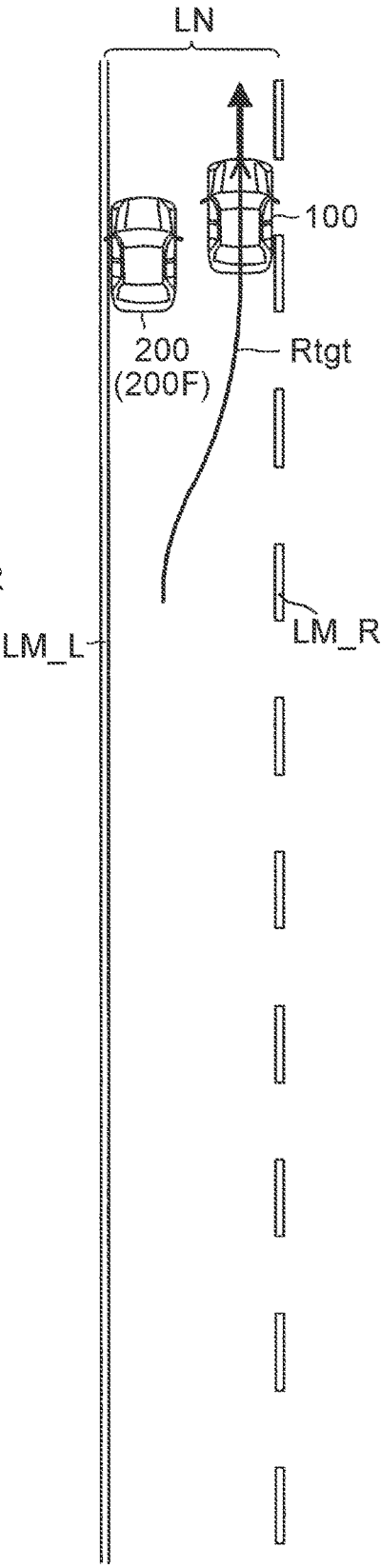
FIG. 9C is a diagram illustrating a scene in which the driver's vehicle has passed by the forward object (vehicle) and the forced steering is terminated.

The vehicle collision avoidance assistance device 10 terminates the forced steering when the driver's vehicle 100 has passed by the side of the forward object 200F as illustrated in FIG. 9C.

In addition to the forced steering, the vehicle collision avoidance assistance device 10 may decelerate the driver's vehicle 100 by reducing the driving force applied to the driver's vehicle 100, limiting the driving force to a certain value or smaller, or applying a braking force to the driver's vehicle 100. In this case, the vehicle collision avoidance assistance device 10 terminates the forced steering when the driver's vehicle 100 is stopped.

For example, when there is a possibility during the forced steering that the driver's vehicle 100 collides with another object such as a person who has appeared from behind the forward object 200F, the vehicle collision avoidance assistance device 10 may perform the forced braking by applying a braking force to the driver's vehicle 100 and forcibly stopping the driver's vehicle 100 to avoid a collision between the driver's vehicle 100 and the other object.

When the driver input torque TQs_driver is equal to or larger than a predetermined relatively large torque TQth during the forced steering, the vehicle collision avoidance assistance device 10 may stop the forced steering.

The above is the outline of the operation of the vehicle collision avoidance assistance device 10. According to the above description, in a scene in which execution of the forced steering is preferable such that the request condition Creq is satisfied, the forced steering is performed except for a situation in which non-execution of the forced steering is preferable such that the forbiddance condition Cfbd is satisfied. Thus, an appropriate collision avoidance process is performed depending on the situation around the driver's vehicle 100.

Specific Operations of Vehicle Collision Avoidance Assistance Device

Figure 10:
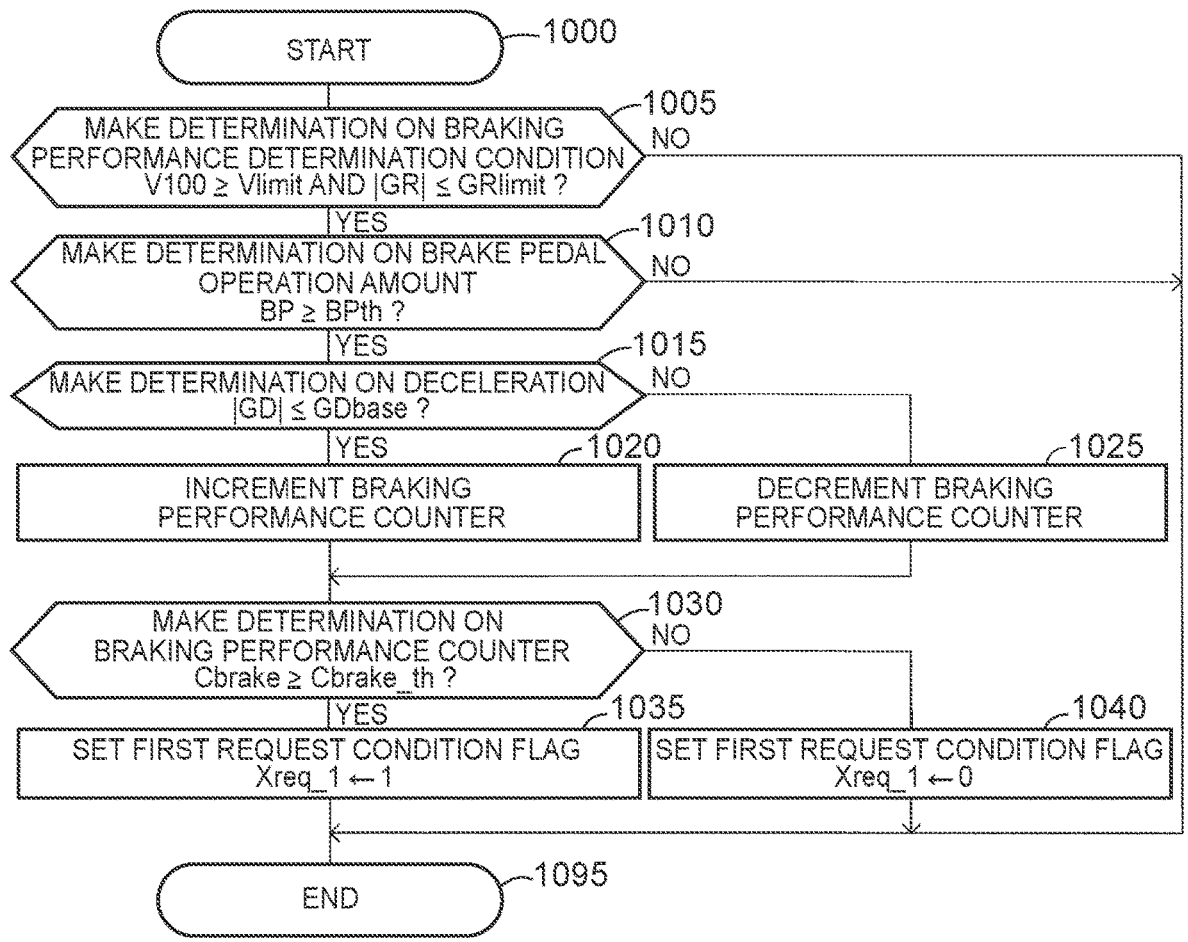
FIG. 10 is a flowchart illustrating a routine to be executed by the vehicle collision avoidance assistance device according to the embodiment of the present disclosure.

Next, specific operations of the vehicle collision avoidance assistance device 10 will be described. The CPU of the ECU 90 of the vehicle collision avoidance assistance device 10 executes a routine illustrated in FIG. 10 in a predetermined calculation cycle. At a predetermined timing, the CPU starts a process from Step 1000 in FIG. 10, and advances the process to Step 1005 to determine whether the vehicle speed V100 of the driver's vehicle 100 is equal to or higher than the lower limit vehicle speed Vlimit and whether the road surface gradient GR is equal to or smaller than the upper limit gradient GRlimit.

When the CPU determines "Yes" in Step 1005, the CPU advances the process to Step 1010 to determine whether the brake pedal operation amount BP is equal to or larger than the predetermined brake pedal operation amount BPth.

When the CPU determines "Yes" in Step 1010, the CPU advances the process to Step 1015 to determine whether the deceleration GD of the driver's vehicle 100 is equal to or lower than the reference deceleration GDbase.

When the CPU determines "Yes" in Step 1015, the CPU advances the process to Step 1020 to increment the braking performance counter Cbrake. Next, the CPU advances the process to Step 1030.

When the CPU determines "No" in Step 1015, the CPU advances the process to Step 1025 to decrement the braking performance counter Cbrake. Next, the CPU advances the process to Step 1030.

When the CPU advances the process to Step 1030, the CPU determines whether the braking performance counter Cbrake is equal to or larger than the predetermined value Cbrake_th.

When the CPU determines "Yes" in Step 1030, the CPU sets the value of a first request condition flag Xreq_1 to "1". The first request condition flag Xreq_1 indicates whether the first request condition Creq_1 is satisfied. When the value is "1", the first request condition flag Xreq_1 indicates that the first request condition Creq_1 is satisfied. When the value is "0", the first request condition flag Xreq_1 indicates that the first request condition Creq_1 is not satisfied.

Next, the CPU advances the process to Step 1095 to temporarily terminate this routine.

When the CPU determines "No" in Step 1030, the CPU advances the process to Step 1040 to set the value of the first request condition flag Xreq_1 to "0". Next, the CPU advances the process to Step 1095 to temporarily terminate this routine.

When the CPU determines "No" in Step 1005 or Step 1010, the CPU directly advances the process to Step 1095 to temporarily terminate this routine.

Figure 11:
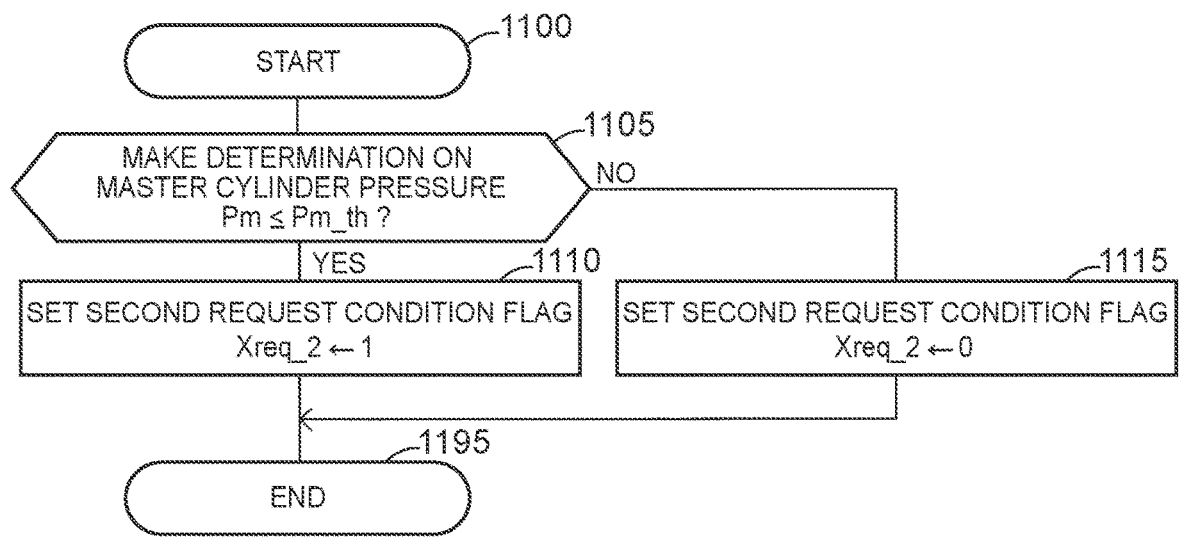
FIG. 11 is a flowchart illustrating a routine to be executed by the vehicle collision avoidance assistance device according to the embodiment of the present disclosure.

The CPU executes a routine illustrated in FIG. 11 in a predetermined calculation cycle. At a predetermined timing, the CPU starts a process from Step 1100 in FIG. 11, and advances the process to Step 1105 to determine whether the master cylinder pressure Pm is equal to or lower than the predetermined pressure Pm_th.

When the CPU determines "Yes" in Step 1105, the CPU advances the process to Step 1110 to set the value of a second request condition flag Xreq_2 to "1". The second request condition flag Xreq_2 indicates whether the second request condition Creq_2 is satisfied. When the value is "1", the second request condition flag Xreq_2 indicates that the second request condition Creq_2 is satisfied. When the value is "0", the second request condition flag Xreq_2 indicates that the second request condition Creq_2 is not satisfied.

Next, the CPU advances the process to Step 1195 to temporarily terminate this routine.

When the CPU determines "No" in Step 1105, the CPU advances the process to Step 1115 to set the value of the second request condition flag Xreq_2 to "0". Next, the CPU advances the process to Step 1195 to temporarily terminate this routine.

Figure 12:
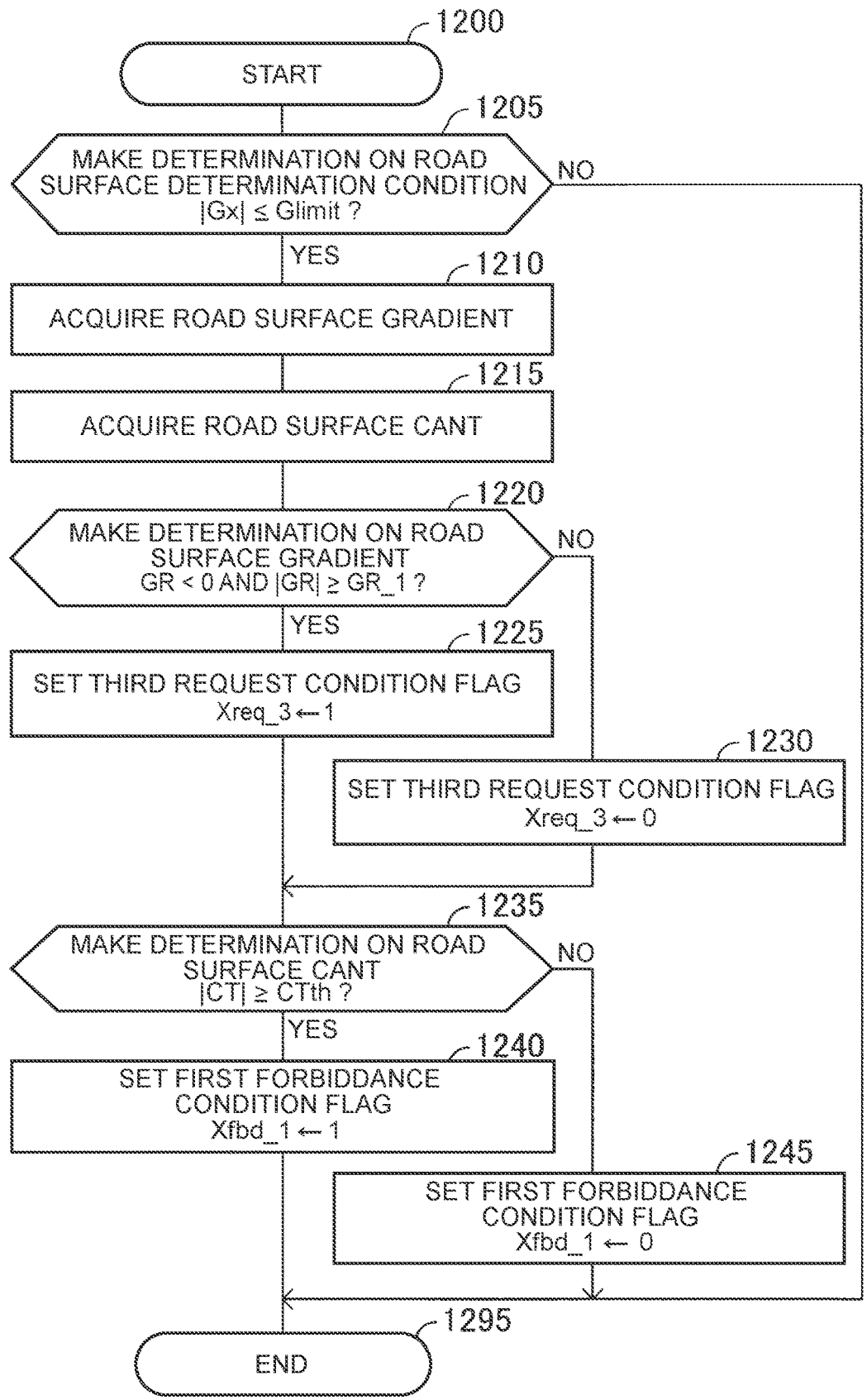
FIG. 12 is a flowchart illustrating a routine to be executed by the vehicle collision avoidance assistance device according to the embodiment of the present disclosure.

The CPU executes a routine illustrated in FIG. 12 in a predetermined calculation cycle. At a predetermined timing, the CPU starts a process from Step 1200 in FIG. 12, and advances the process to Step 1205 to determine whether the absolute value of the acceleration of the driver's vehicle 100 (longitudinal acceleration Gx) is equal to or smaller than the upper limit acceleration Glimit.

When the CPU determines "Yes" in Step 1205, the CPU advances the process to Step 1210 to acquire the road surface gradient GR. Next, the CPU advances the process to Step 1215 to acquire the road surface cant CT. Next, the CPU advances the process to Step 1220 to determine whether the road surface gradient GR is smaller than zero and its absolute value is equal to or larger than the first gradient GR_1.

When the CPU determines "Yes" in Step 1220, the CPU advances the process to Step 1225 to set the value of a third request condition flag Xreq3 to "1". The third request condition flag Xreq_3 indicates whether the third request condition Creq_3 is satisfied. When the value is "1", the third request condition flag Xreq_3 indicates that the third request condition Creq_3 is satisfied. When the value is "0", the third request condition flag Xreq_3 indicates that the third request condition Creq_3 is not satisfied.

Next, the CPU advances the process to Step 1235.

When the CPU determines "No" in Step 1220, the CPU advances the process to Step 1230 to set the value of the third request condition flag Xreq_3 to "0". Next, the CPU advances the process to Step 1235.

When the CPU advances the process to Step 1235, the CPU determines whether the road surface cant CT is equal to or larger than the predetermined cant CTth.

When the CPU determines "Yes" in Step 1235, the CPU advances the process to Step 1240 to set the value of a first forbiddance condition flag Xfbd_1 to "1". The first forbiddance condition flag Xfbd_1 indicates whether the first forbiddance condition Cfbd_1 is satisfied. When the value is "1", the first forbiddance condition flag Xfbd_1 indicates that the first forbiddance condition Cfbd_1 is satisfied. When the value is "0", the first forbiddance condition flag Xfbd_1 indicates that the first forbiddance condition Cfbd_1 is not satisfied.

Next, the CPU advances the process to Step 1295 to temporarily terminate this routine.

When the CPU determines "No" in Step 1235, the CPU advances the process to Step 1245 to set the value of the first forbiddance condition flag Xfbd_1 to "0". Next, the CPU advances the process to Step 1295 to temporarily terminate this routine.

When the CPU determines "No" in Step 1205, the CPU directly advances the process to Step 1295 to temporarily terminate this routine.

Figure 13:
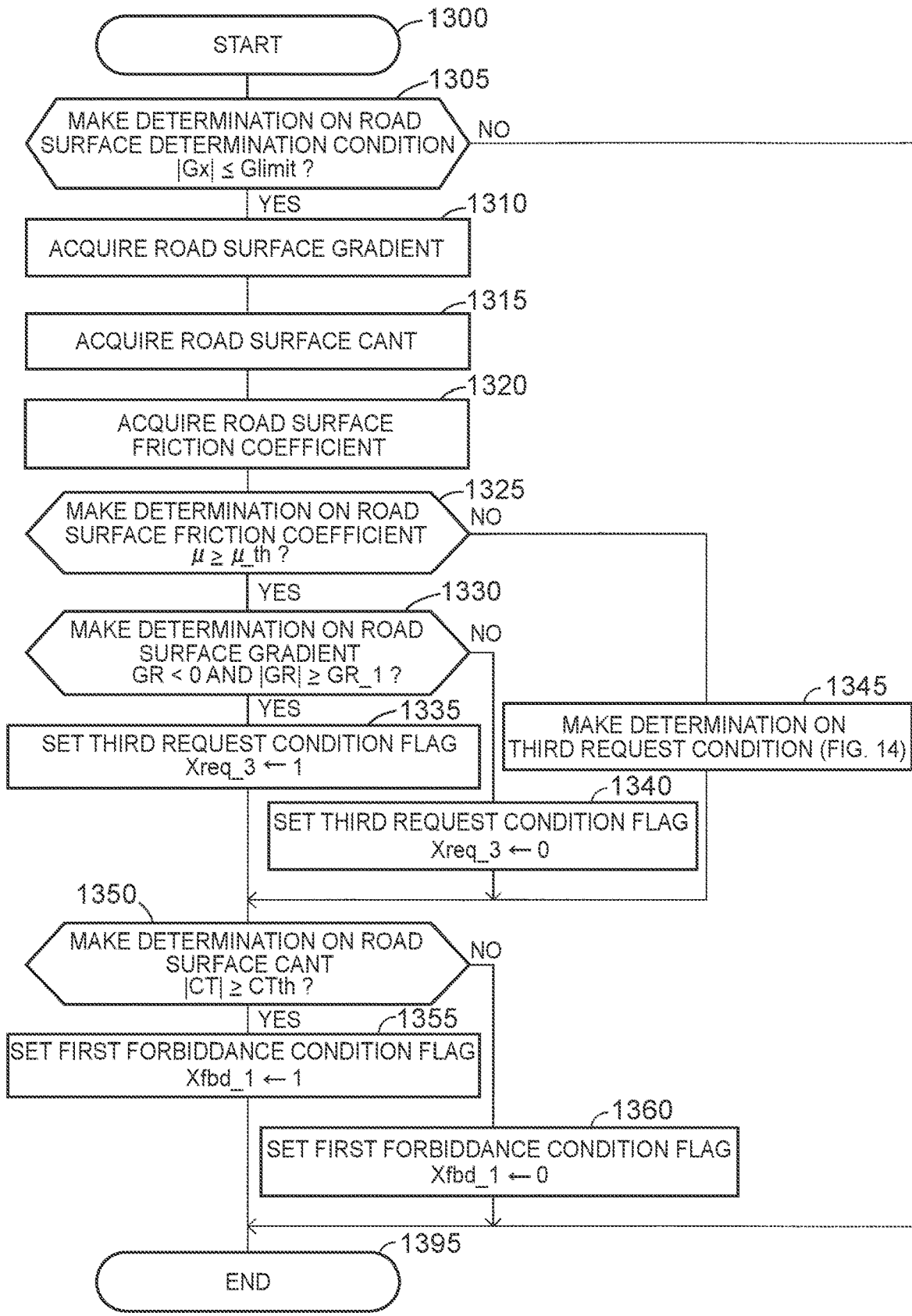
FIG. 13 is a flowchart illustrating a routine to be executed by the vehicle collision avoidance assistance device according to the embodiment of the present disclosure.

The CPU may execute a routine illustrated in FIG. 13 in a predetermined calculation cycle in place of the routine illustrated in FIG. 12. At a predetermined timing, the CPU starts a process from Step 1300 in FIG. 13, and advances the process to Step 1305 to determine whether the absolute value of the acceleration Gx of the driver's vehicle 100 is equal to or smaller than the upper limit acceleration Glimit.

When the CPU determines "Yes" in Step 1305, the CPU advances the process to Step 1310 to acquire the road surface gradient GR. Next, the CPU advances the process to Step 1315 to acquire the road surface cant CT. Next, the CPU advances the process to Step 1320 to acquire the road surface friction coefficient. Next, the CPU advances the process to Step 1325 to determine whether the road surface friction coefficient is equal to or larger than the predetermined friction coefficient μ_th.

When the CPU determines "Yes" in Step 1325, the CPU advances the process to Step 1330 to determine whether the road surface gradient GR is smaller than zero and its absolute value is equal to or larger than the first gradient GR_1.

When the CPU determines "Yes" in Step 1330, the CPU advances the process to Step 1335 to set the value of the third request condition flag Xreq_3 to "1". Next, the CPU advances the process to Step 1350.

When the CPU determines "No" in Step 1330, the CPU advances the process to Step 1340 to set the value of the third request condition flag Xreq_3 to "0". Next, the CPU advances the process to Step 1350.

Figure 14:
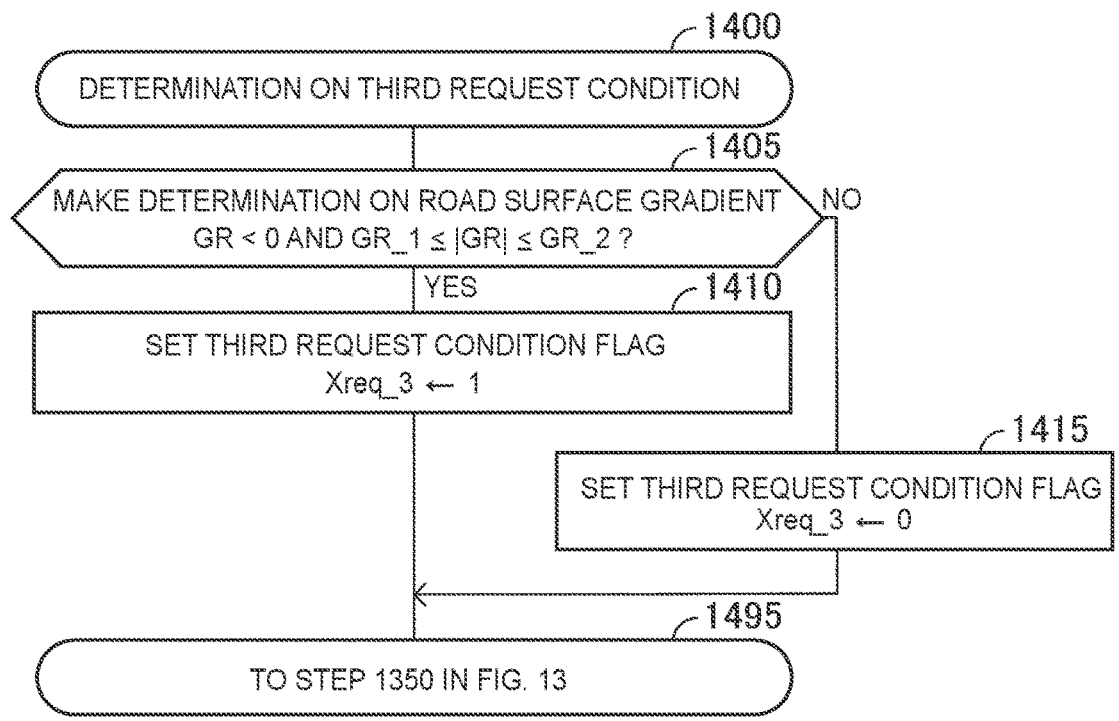
FIG. 14 is a flowchart illustrating a routine to be executed by the vehicle collision avoidance assistance device according to the embodiment of the present disclosure.

When the CPU determines "No" in Step 1325, the CPU advances the process to Step 1345 to execute a routine illustrated in FIG. 14. When the CPU advances the process to Step 1345, the CPU starts a process from Step 1400 in FIG. 14, and advances the process to Step 1405 to determine whether the road surface gradient GR is smaller than zero and its absolute value is equal to or larger than the first gradient GR_1 and equal to or smaller than the second gradient GR_2.

When the CPU determines "Yes" in Step 1405, the CPU advances the process to Step 1410 to set the value of the third request condition flag Xreq_3 to "1". Next, the CPU advances the process to Step 1350 in FIG. 13 via Step 1495.

When the CPU determines "No" in Step 1405, the CPU advances the process to Step 1415 to set the value of the third request condition flag Xreq_3 to "0". Next, the CPU advances the process to Step 1350 in FIG. 13 via Step 1495.

When the CPU advances the process to Step 1350, the CPU determines whether the road surface cant CT is equal to or larger than the predetermined cant CTth.

When the CPU determines "Yes" in Step 1350, the CPU advances the process to Step 1355 to set the value of the first forbiddance condition flag Xfbd_1 to "1". Next, the CPU advances the process to Step 1395 to temporarily terminate this routine.

When the CPU determines "No" in Step 1350, the CPU advances the process to Step 1360 to set the value of the first forbiddance condition flag Xfbd_1 to "0". Next, the CPU advances the process to Step 1395 to temporarily terminate this routine.

When the CPU determines "No" in Step 1305, the CPU directly advances the process to Step 1395 to temporarily terminate this routine.

Figure 15:
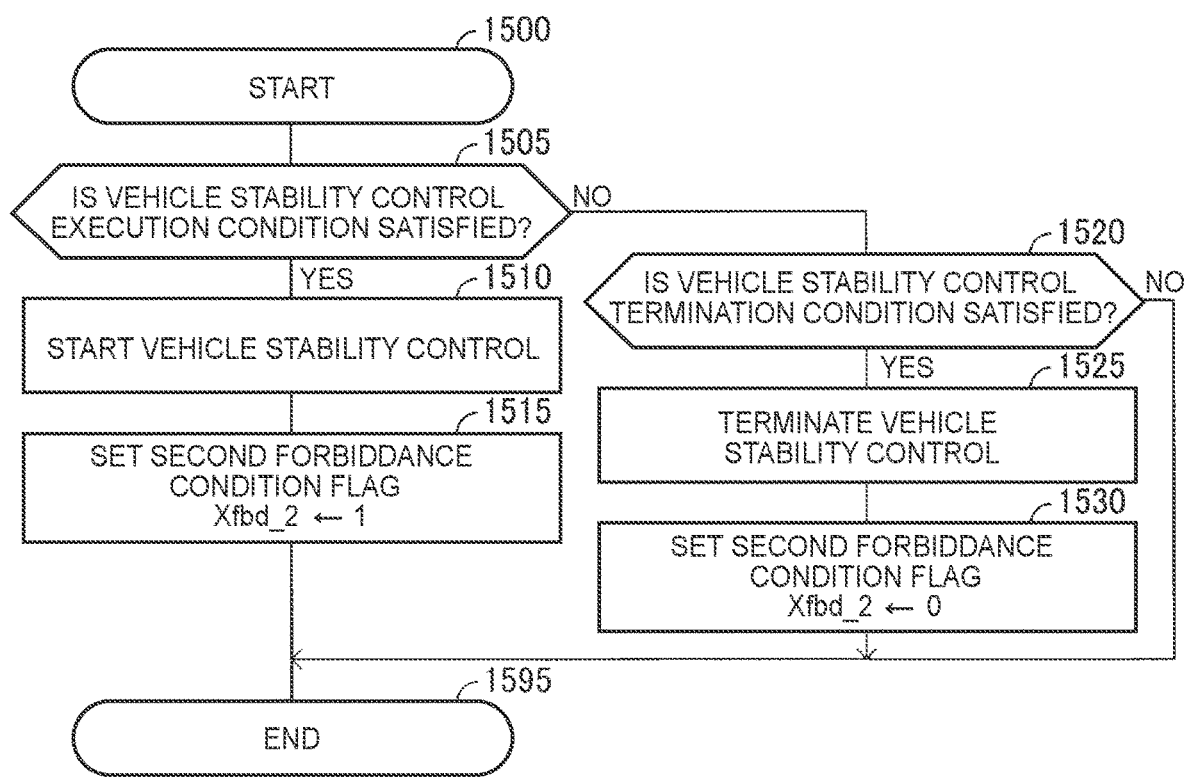
FIG. 15 is a flowchart illustrating a routine to be executed by the vehicle collision avoidance assistance device according to the embodiment of the present disclosure.

The CPU executes a routine illustrated in FIG. 15 in a predetermined calculation cycle. At a predetermined timing, the CPU starts a process from Step 1500 in FIG. 15, and advances the process to Step 1505 to determine whether the condition for performing the vehicle stability control is satisfied.

When the CPU determines "Yes" in Step 1505, the CPU advances the process to Step 1510 to start the vehicle stability control. Next, the CPU advances the process to Step 1515 to set the value of a second forbiddance condition flag Xfbd_2 to "1". The second forbiddance condition flag Xfbd_2 indicates whether the second forbiddance condition Cfbd_2 is satisfied. When the value is "1", the second forbiddance condition flag Xfbd_2 indicates that the second forbiddance condition Cfbd_2 is satisfied. When the value is "0", the second forbiddance condition flag Xfbd_2 indicates that the second forbiddance condition Cfbd_2 is not satisfied.

Next, the CPU advances the process to Step 1595 to temporarily terminate this routine.

When the CPU determines "No" in Step 1505, the CPU advances the process to Step 1520 to determine whether the condition for terminating the vehicle stability control is satisfied.

When the CPU determines "Yes" in Step 1520, the CPU advances the process to Step 1525 to terminate the vehicle stability control. Next, the CPU advances the process to Step 1530 to set the value of the second forbiddance condition flag Xfbd_2 to "0". Next, the CPU advances the process to Step 1595 to temporarily terminate this routine.

When the CPU determines "No" in Step 1520, the CPU directly advances the process to Step 1595 to temporarily terminate this routine.

Figure 16:
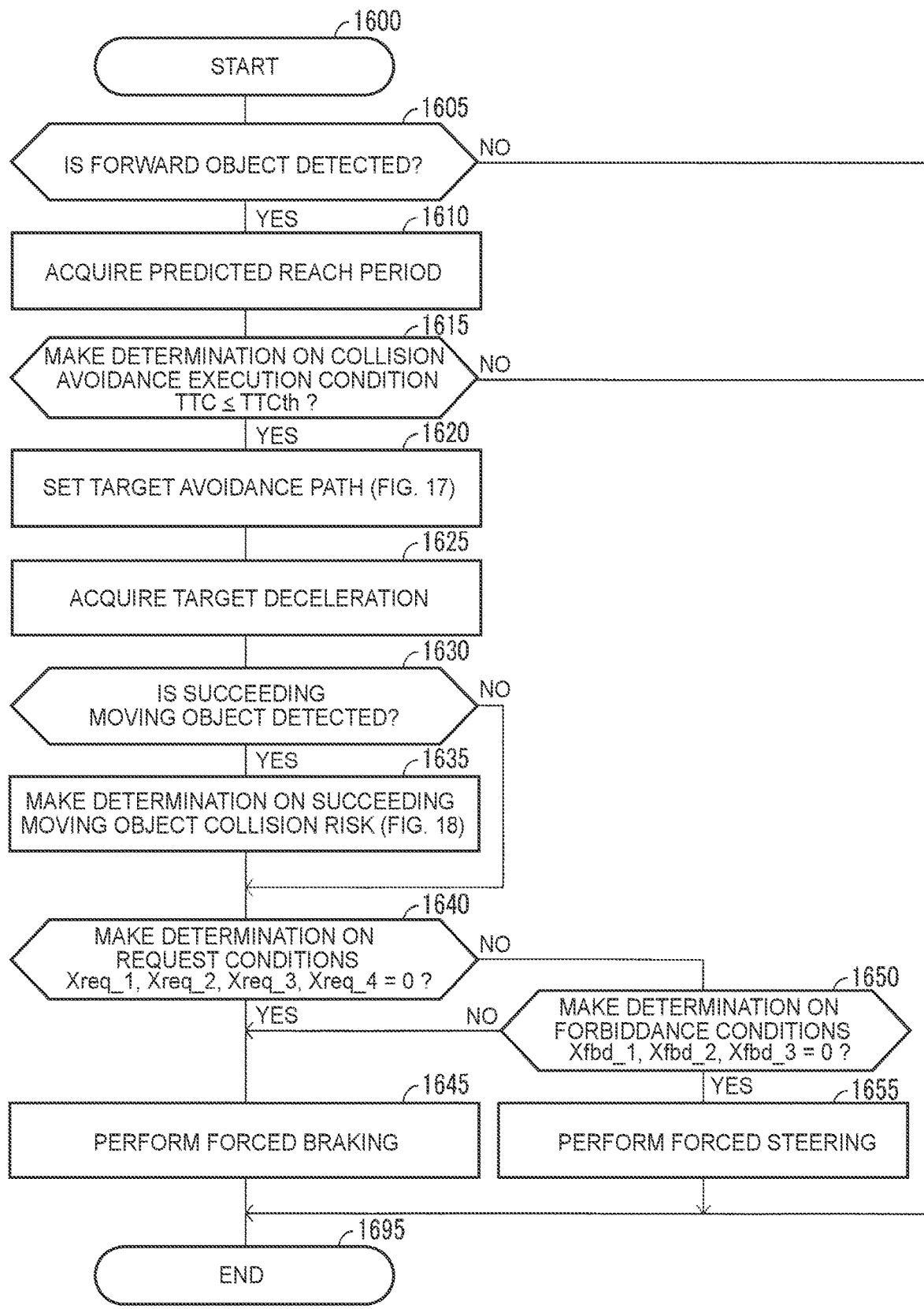
FIG. 16 is a flowchart illustrating a routine to be executed by the vehicle collision avoidance assistance device according to the embodiment of the present disclosure.

The CPU executes a routine illustrated in FIG. 16 in a predetermined calculation cycle. At a predetermined timing, the CPU starts a process from Step 1600 in FIG. 16, and advances the process to Step 1605 to determine whether the forward object 200F is detected.

When the CPU determines "Yes" in Step 1605, the CPU advances the process to Step 1610 to acquire the predicted reach period TTC. Next, the CPU advances the process to Step 1615 to determine whether the predicted reach period TTC is equal to or shorter than the predetermined predicted reach period TTCth.

Figure 17:
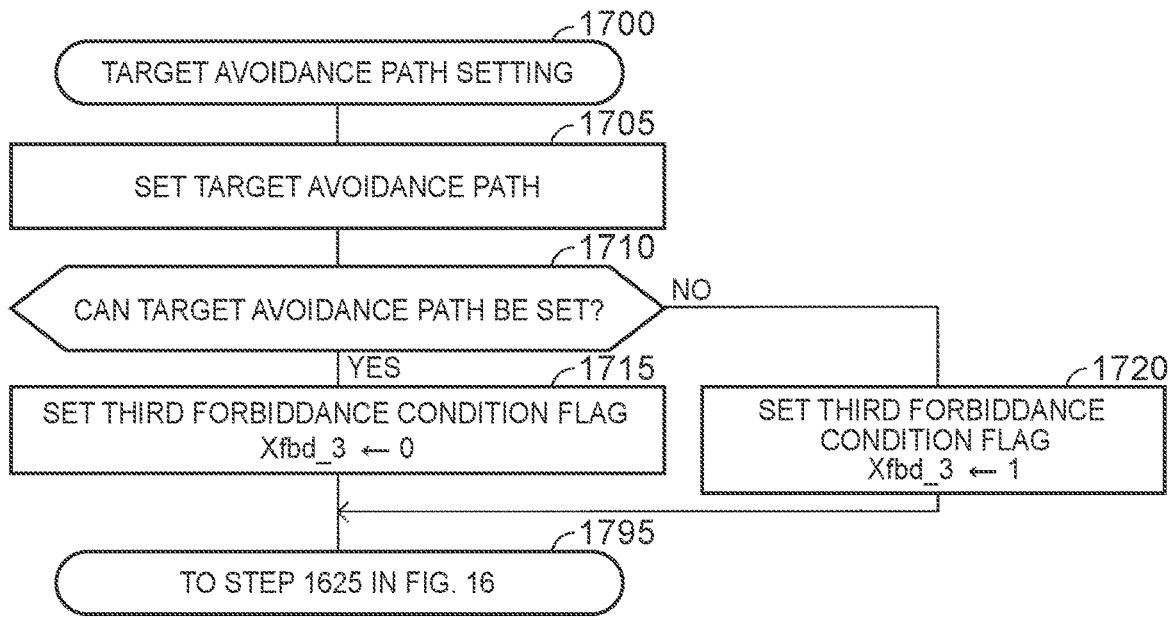
FIG. 17 is a flowchart illustrating a routine to be executed by the vehicle collision avoidance assistance device according to the embodiment of the present disclosure.

When the CPU determines "Yes" in Step 1615, the CPU advances the process to Step 1620 to execute a routine illustrated in FIG. 17. When the CPU advances the process to Step 1620, the CPU starts a process from Step 1700 in FIG. 17, and advances the process to Step 1705 to set the target avoidance path Rtgt. Next, the CPU advances the process to Step 1710 to determine whether the target avoidance path Rtgt can be set.

When the CPU determines "Yes" in Step 1710, the CPU advances the process to Step 1715 to set the value of a third forbiddance condition flag Xfbd_3 to "0". The third forbiddance condition flag Xfbd_3 indicates whether the third forbiddance condition Cfbd_3 is satisfied. When the value is "1", the third forbiddance condition flag Xfbd_3 indicates that the third forbiddance condition Cfbd_3 is satisfied. When the value is "0", the third forbiddance condition flag Xfbd_3 indicates that the third forbiddance condition Cfbd_3 is not satisfied.

Next, the CPU advances the process to Step 1625 in FIG. 16 via Step 1795.

When the CPU determines "No" in Step 1710, the CPU advances the process to Step 1720 to set the value of the third forbiddance condition flag Xfbd_3 to "1". Next, the CPU advances the process to Step 1625 in FIG. 16 via Step 1795.

When the CPU advances the process to Step 1625 in FIG. 16, the CPU acquires the target deceleration GDtgt. Next, the CPU advances the process to Step 1630 to determine whether the succeeding moving object 300 is detected.

Figure 18:
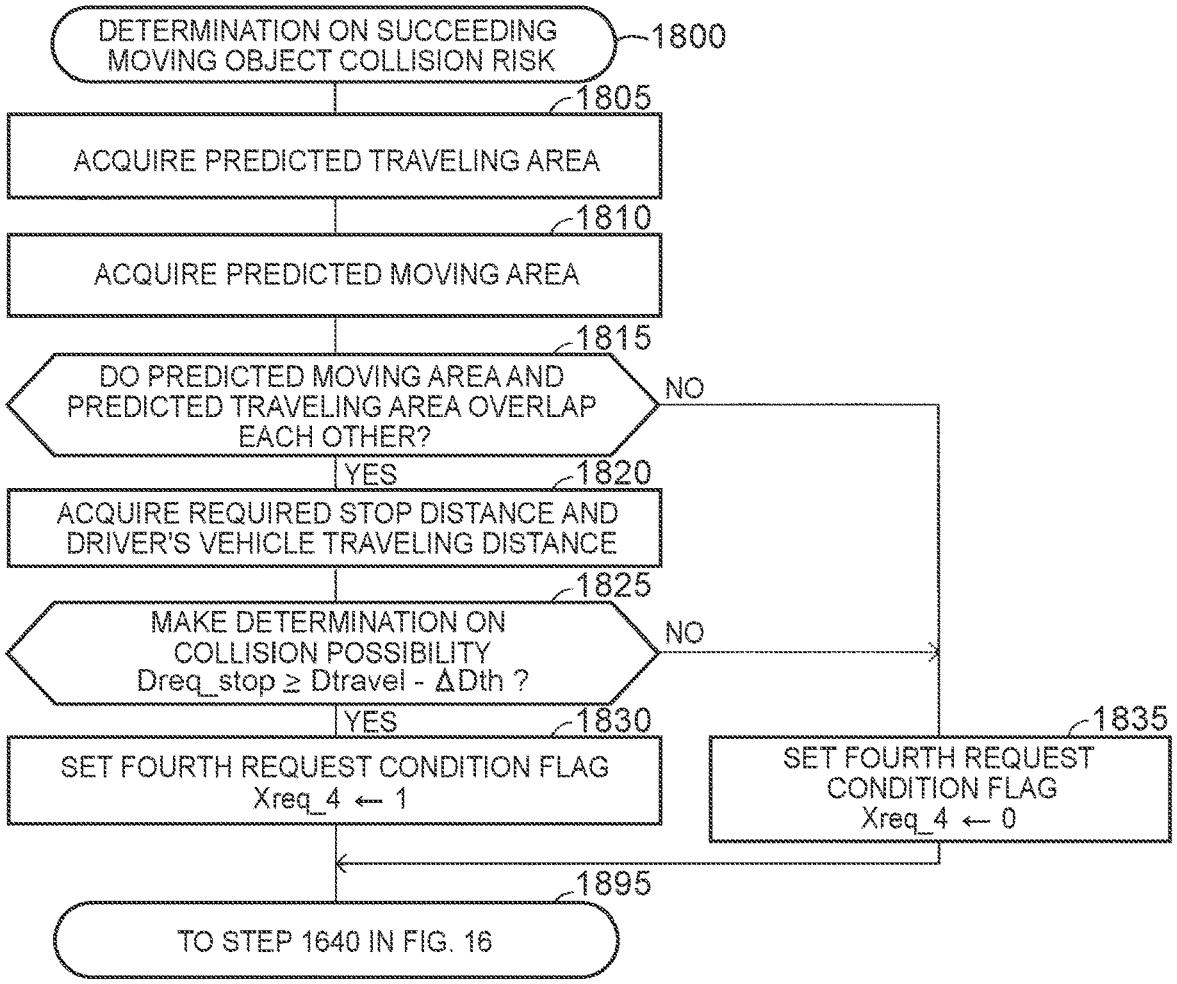
FIG. 18 is a flowchart illustrating a routine to be executed by the vehicle collision avoidance assistance device according to the embodiment of the present disclosure.

When the CPU determines "Yes" in Step 1630, the CPU advances the process to Step 1635 to execute a routine illustrated in FIG. 18. When the CPU advances the process to Step 1635, the CPU starts a process from Step 1800 in FIG. 18, and advances the process to Step 1805 to acquire the predicted traveling area A100. Next, the CPU advances the process to Step 1810 to acquire the predicted moving area A300. Next, the CPU advances the process to Step 1815 to determine whether the predicted moving area A300 and the predicted traveling area A100 overlap each other.

When the CPU determines "Yes" in Step 1815, the CPU advances the process to Step 1820 to acquire the required stop distance Dreq_stop and the driver's vehicle traveling distance Dtravel. Next, the CPU advances the process to Step 1825 to determine whether the required stop distance Dreq_stop is equal to or longer than a distance obtained by subtracting the predetermined distance ΔDth from the driver's vehicle traveling distance Dtravel.

When the CPU determines "Yes" in Step 1825, the CPU advances the process to Step 1830 to set the value of a fourth request condition flag Xreq_4 to "1". The fourth request condition flag Xreq_4 indicates whether the fourth request condition Creq_4 is satisfied. When the value is "1", the fourth request condition flag Xreq_4 indicates that the fourth request condition Creq_4 is satisfied. When the value is "0", the fourth request condition flag Xreq_4 indicates that the fourth request condition Creq_4 is not satisfied.

Next, the CPU advances the process to Step 1640 in FIG. 16 via Step 1895.

When the CPU determines "No" in Step 1825, the CPU advances the process to Step 1835 to set the value of the fourth request condition flag Xreq_4 to "0". Next, the CPU advances the process to Step 1640 in FIG. 16 via Step 1895.

When the CPU determines "No" in Step 1815, the CPU advances the process to Step 1835 to set the value of the fourth request condition flag Xreq_4 to "0". Next, the CPU advances the process to Step 1640 in FIG. 16 via Step 1895.

When the CPU advances the process to Step 1640 in FIG. 16, the CPU determines whether all the values of the first request condition flag Xreq_1 to the fourth request condition flag Xreq_4 are "0".

When the CPU determines "Yes" in Step 1640, the CPU advances the process to Step 1645 to perform the forced braking. Next, the CPU advances the process to Step 1695 to temporarily terminate this routine.

When the CPU determines "No" in Step 1640, the CPU advances the process to Step 1650 to determine whether all the values of the first forbiddance condition flag Xfbd_1 to the third forbiddance condition flag Xfbd_3 are "0".

When the CPU determines "Yes" in Step 1650, the CPU advances the process to Step 1655 to perform the forced steering. Next, the CPU advances the process to Step 1695 to temporarily terminate this routine.

When the CPU determines "No" in Step 1650, the CPU advances the process to Step 1645 to perform the forced braking. Next, the CPU advances the process to Step 1695 to temporarily terminate this routine.

When the CPU determines "No" in Step 1605 or Step 1615, the CPU directly advances the process to Step 1695 to temporarily terminate this routine.

The above are the specific operations of the vehicle collision avoidance assistance device 10.

The present disclosure is not limited to the embodiment described above, and a variety of modifications can be adopted within the scope of the present disclosure.

What is claimed is:

1. A vehicle collision avoidance assistance device comprising a processor configured to:
   perform forced braking or forced steering when a driver's vehicle has a possibility of colliding with an object ahead of the driver's vehicle, the forced braking being braking for avoiding a collision between the driver's vehicle and the object by applying a braking force to the driver's vehicle to stop the driver's vehicle before the driver's vehicle collides with the object, the forced steering being steering for avoiding the collision between the driver's vehicle and the object by steering the driver's vehicle to pass by a side of the object;
   acquire vehicle information related to a condition of the driver's vehicle;
   acquire a road surface cant value of a road on which the driver's vehicle is traveling;
   determine whether a request condition for requesting execution of the forced steering is satisfied based on the vehicle information;
   determine that a forbiddance condition for forbidding the execution of the forced steering is satisfied when the road surface cant value is equal to or larger than a predetermined cant value;
   determine that the forbiddance condition is not satisfied when the road surface cant value is smaller than the predetermined cant value;
   perform the forced braking regardless of whether the forbiddance condition is satisfied when the request condition is not satisfied;
   perform the forced steering when the forbiddance condition is not satisfied and the request condition is satisfied; and
   perform the forced braking though the request condition is satisfied when the forbiddance condition is satisfied.

2. The vehicle collision avoidance assistance device according to claim 1, wherein
   the vehicle information further includes brake deterioration status information that indicates a deterioration status of a brake of the driver's vehicle, and
   the processor is configured to:
      acquire the brake deterioration status information;
      determine that the request condition is satisfied when the processor determines that the device is deteriorated based on the deterioration status of the brake; and
      determine that the request condition is not satisfied when the processor determines that the brake is not deteriorated based on the deterioration status of the brake.

3. The vehicle collision avoidance assistance device according to claim 1, wherein
   the vehicle information further includes brake pad deterioration status information that indicates a deterioration status of a brake pad of a brake of the driver's vehicle, and the processor is configured to:
  acquire the brake pad deterioration status information;
  determine that the request condition is satisfied when the processor determines that the brake pad is deteriorated based on the deterioration status of the brake pad; and
  determine that the request condition is not satisfied when the processor determines that the brake pad is not deteriorated based on the deterioration status of the brake pad.

4. The vehicle collision avoidance assistance device according to claim 1, wherein
the vehicle information further includes brake oil deterioration status information that indicates a deterioration status of brake oil for operating a brake of the driver's vehicle, and
the processor is configured to:
  acquire the brake oil deterioration status information;
  determine that the request condition is satisfied when the processor determines that the brake oil is deteriorated based on the deterioration status of the brake oil; and
  determine that the request condition is not satisfied when the processor determines that the brake oil is not deteriorated based on the deterioration status of the brake oil.

5. The vehicle collision avoidance assistance device according to claim 1, wherein
the vehicle information further includes a weight of the driver's vehicle, and
the processor is configured to:
  acquire the weight of the driver's vehicle;
  determine that the request condition is satisfied when the processor determines that the weight is equal to or larger than a predetermined weight; and
  determine that the request condition is not satisfied when the processor determines that the weight is smaller than the predetermined weight.

6. The vehicle collision avoidance assistance device according to claim 1, wherein
the vehicle information further includes a pressure in a master cylinder of a brake of the driver's vehicle, and
the processor is configured to:
  acquire the pressure in the master cylinder;
  determine that the request condition is satisfied when the pressure in the master cylinder is equal to or lower than a predetermined pressure; and
  determine that the request condition is not satisfied when the pressure in the master cylinder is higher than the predetermined pressure.

7. The vehicle collision avoidance assistance device according to claim 1, wherein the processor is configured to:
  acquire a gradient of a road surface of the road on which the driver's vehicle is traveling;
  determine that the request condition is satisfied when the gradient is smaller than zero and an absolute value of the gradient is equal to or larger than a first gradient; and
  determine that the request condition is not satisfied when the gradient is equal to or larger than zero, or when the absolute value of the gradient is smaller than the first gradient and the gradient is smaller than zero.

8. The vehicle collision avoidance assistance device according to claim 1, wherein the processor is configured to:
  acquire a gradient of a road surface of the road on which the driver's vehicle is traveling and a friction coefficient of the road surface;
  determine that the request condition is satisfied when the friction coefficient is equal to or smaller than a predetermined friction coefficient, the gradient is smaller than zero, and an absolute value of the gradient is equal to or larger than a first gradient;
  determine that the request condition is not satisfied when the friction coefficient is equal to or smaller than the predetermined friction coefficient and the gradient is equal to or larger than zero, or when the absolute value of the gradient is smaller than the first gradient and the gradient is smaller than zero;
  determine that the request condition is satisfied when the friction coefficient is larger than the predetermined friction coefficient, the gradient is smaller than zero, the absolute value of the gradient is equal to or larger than the first gradient, and the absolute value of the gradient is equal to or smaller than a second gradient that is larger than the first gradient; and
  determine that the request condition is not satisfied when the friction coefficient is larger than the predetermined friction coefficient and the gradient is equal to or larger than zero, or when the gradient is smaller than zero and the absolute value of the gradient is smaller than the first gradient or larger than the second gradient.

\* \* \* \* \*